United States Patent
Akatsuka et al.

(10) Patent No.: US 10,435,024 B2
(45) Date of Patent: Oct. 8, 2019

(54) DRIVING SUPPORT APPARATUS PERFORMING DRIVING SUPPORT BASED ON RELIABILITY OF EACH DETECTION APPARATUS

(71) Applicant: DENSO CORPORATION, Kariya, Aichi-pref. (JP)

(72) Inventors: Hisaya Akatsuka, Kariya (JP); Daiji Watanabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/653,343

(22) Filed: Jul. 18, 2017

(65) Prior Publication Data

US 2018/0022354 A1    Jan. 25, 2018

(30) Foreign Application Priority Data

Jul. 19, 2016    (JP) .................................. 2016-141728

(51) Int. Cl.
| | |
|---|---|
| G06F 17/00 | (2019.01) |
| B60Q 1/00 | (2006.01) |
| B60W 30/18 | (2012.01) |
| B60W 10/04 | (2006.01) |
| B60W 30/14 | (2006.01) |

(52) U.S. Cl.
CPC ...... *B60W 30/18145* (2013.01); *B60W 10/04* (2013.01); *B60W 30/143* (2013.01); *B60W 2550/402* (2013.01); *G05D 2201/0213* (2013.01)

(58) Field of Classification Search
None
See application file for complete search history.

(56) References Cited

U.S. PATENT DOCUMENTS

2010/0063672 A1*  3/2010  Anderson ............ G05D 1/0077
                                                            701/29.2
2013/0060427 A1   3/2013  Kataoka et al.

FOREIGN PATENT DOCUMENTS

| JP | 2015-020604 | 2/2015 |
|---|---|---|
| JP | 2015-033942 | 2/2015 |
| JP | 2015-178332 A | 10/2015 |

* cited by examiner

*Primary Examiner* — Adam D Tissot
(74) *Attorney, Agent, or Firm* — Knobbe, Martens, Olson & Bear, LLP

(57) ABSTRACT

A driving support apparatus performing a plurality of driving support includes: a reliability acquiring unit that acquires each reliability of a plurality of detection apparatus, the reliability representing likelihood of a detection result of the detection apparatus; a determination unit that determines whether or not each of the detection apparatus is a high reliability apparatus determined based on a reliability threshold; a correspondence acquiring unit that acquires correspondence information representing a correspondence between combinations of the plurality of detection apparatus including information of whether or not each apparatus is a high reliability apparatus, and types of driving support to be performed; a setting unit that sets a driving support to be performed, based on a result of the determination; an executing unit that executes the driving support to be performed; and an output unit that outputs a command to allow the executing unit to execute the driving support.

7 Claims, 12 Drawing Sheets

FIG.4

CORRESPONDENCE INFORMATION

| COMBINATION NUMBER | RELIABILITY | | | DRIVING SUPPORT TO BE PERFORMED (LC: LANE CHANGE) | |
|---|---|---|---|---|---|
| | CAMERA | GPS | RANGING SENSOR | DRIVING SUPPORT RELATED TO SPEED | DRIVING SUPPORT RELATED TO STEERING |
| 1 | HIGH | HIGH | HIGH | AUTOMATIC SPEED CONTROL (MAINTAIN INTER-VEHICLE DISTANCE (RANGING SENSOR 1), DECELERATION SUPPORT(GPS)) | AUTOMATIC STEERING CONTROL (LANE TRAVELING (CAMERA) + LC (RANGING SENSOR)), ASSIST CONTROL |
| 2 | HIGH | HIGH | LOW | AUTOMATIC SPEED CONTROL (DECELERATION SUPPORT (GPS)) | AUTOMATIC STEERING CONTROL (LANE TRAVELING (CAMERA)), ASSIST CONTROL |
| 3 | HIGH | LOW | HIGH | AUTOMATIC SPEED CONTROL (MAINTAIN INTER-VEHICLE DISTANCE (RANGING SENSOR)) | AUTOMATIC STEERING CONTROL (LANE TRAVELING (CAMERA) + LC (RANGING SENSOR)), ASSIST CONTROL |
| 4 | HIGH | LOW | LOW | MANUAL OPERATION | AUTOMATIC STEERING CONTROL (LANE TRAVELING (CAMERA)), ASSIST CONTROL |
| 5 | LOW | HIGH | HIGH | AUTOMATIC SPEED CONTROL (MAINTAIN INTER-VEHICLE DISTANCE (RANGING SENSOR), DECELERATION SUPPORT (GPS)) | SUPPORT DRIVING CONTROL (GPS), ASSIST CONTROL |
| 6 | LOW | HIGH | LOW | AUTOMATIC SPEED CONTROL (DECELERATION SUPPORT (GPS)) | SUPPORT DRIVING CONTROL (GPS), ASSIST CONTROL |
| 7 | LOW | LOW | HIGH | AUTOMATIC SPEED CONTROL (MAINTAIN INTER-VEHICLE DISTANCE (RANGING SENSOR)) | MANUAL OPERATION (ASSIST CONTROL) |
| 8 | LOW | LOW | LOW | MANUAL OPERATION | MANUAL OPERATION (ASSIST CONTROL) |

DRIVING SUPPORT APPARATUS PERFORMING DRIVING SUPPORT BASED ON RELIABILITY OF EACH DETECTION APPARATUS

CROSS-REFERENCE TO RELATED APPLICATION

This application is based on and claims the benefit of priority from earlier Japanese Patent Application No. 2016-141728 filed Jul. 19, 2016, the description of which is incorporated herein by reference.

BACKGROUND OF THE INVENTION

Technical Field

The present disclosure relates to a driving support apparatus.

Description of the Related Art

In order to reduce a driving load of the driver who drives a vehicle, techniques performing various driving support based on the output of sensors mounted on the vehicle, have been developed. For example, JP-A-2015-0178332 discloses a technique for performing so-called automatic driving as a driving support, in which a steering, a brake and an accelerator are automatically operated by using all of the detection results of a plurality of detection apparatus such as a camera, a laser scanner, and a GPS device.

Hereinafter, techniques disclosed in the above-mentioned patent document, i.e., JP-A-2015-0178332 are referred to as conventional art.

However, according to the conventional art, it is determined whether or not the automatic driving is continued, in accordance with sum of the reliabilities in all of the detection apparatus. Hence, assuming a case where a malfunction occurs on one detection apparatus in a plurality of detection apparatus, causing a large degradation of the reliability of the detection apparatus, the sum of the reliabilities is significantly decreased, thereby possibly stopping the automatic driving. In this case, the driving mode is suddenly changed to a manual driving mode where the driver is required to manually drive the vehicle, from the automatic driving mode. As a result, a problem arises that the load of the driver rapidly increases.

SUMMARY

The present disclosure has been achieved in light of the above-mentioned issues, and provides a technique of a driving support which avoids a rapid increase of the load of the driver, when the reliability of the detection apparatus is decreased.

The driving support apparatus according to the present disclosure is mounted on the vehicle and performs a plurality of driving supports. The driving support apparatus is provided with a reliability acquiring unit, a determination unit, a correspondence acquiring unit, a setting unit, an executing unit and an output unit.

The reliability acquiring unit acquires reliability of a plurality of detection apparatus each detecting a state of the vehicle or a state of a surrounding of the vehicle, the reliability being acquired for each of the plurality of detection apparatus, the reliability representing likelihood of a detection result of the detection apparatus. The determination unit determines whether or not each of the detection apparatus is a high reliability apparatus, the high reliability apparatus being determined as a detection apparatus of which the reliability is higher than or equal to a reliability threshold.

The correspondence acquiring unit acquires correspondence information representing a correspondence between combinations of the plurality of detection apparatus including information of whether or not each apparatus is a high reliability apparatus, and types of driving support to be performed. The setting unit sets a driving support to be performed, based on a result of determination whether or not each of the detection apparatus is a high reliability apparatus, and the correspondence information. The executing unit executes the driving support to be performed. The output unit that outputs a command to allow the executing unit to execute the driving support.

Thus, the driving support apparatus according to the present disclosure is provided with a configuration in which types of driving support to be performed are determined in accordance with combinations of high reliability apparatuses of which the reliability is a predetermined reliability threshold or more in the plurality of detection apparatuses. Hence, even when any one of plurality of detection apparatuses has a fault and is no longer a high reliability apparatus, driving support corresponding to remaining combinations can be performed.

In other words, even in the case where the reliability is lowered at any of a plurality of detection apparatus, compared to a conventional art in which a driving support may be completely stopped because of the decline of the reliability, an increase of load of the driver can be suppressed according to the configuration of the present disclosure.

It should be noted that the bracketed reference signs of individual means in this column and in the claims indicate, as an aspect, correspondence to specific means in the embodiments described later, and do not limit the technical scope of the present disclosure.

BRIEF DESCRIPTION OF THE DRAWINGS

In the accompanying drawings:

FIG. 4 is a diagram showing an example of correspondence information;

DETAILED DESCRIPTION OF PREFERRED EMBODIMENTS

Hereinafter, with reference to the drawings, embodiments of the present disclosure will be described.

1. First Embodiment

[1-1 Configuration]

Figure 1:
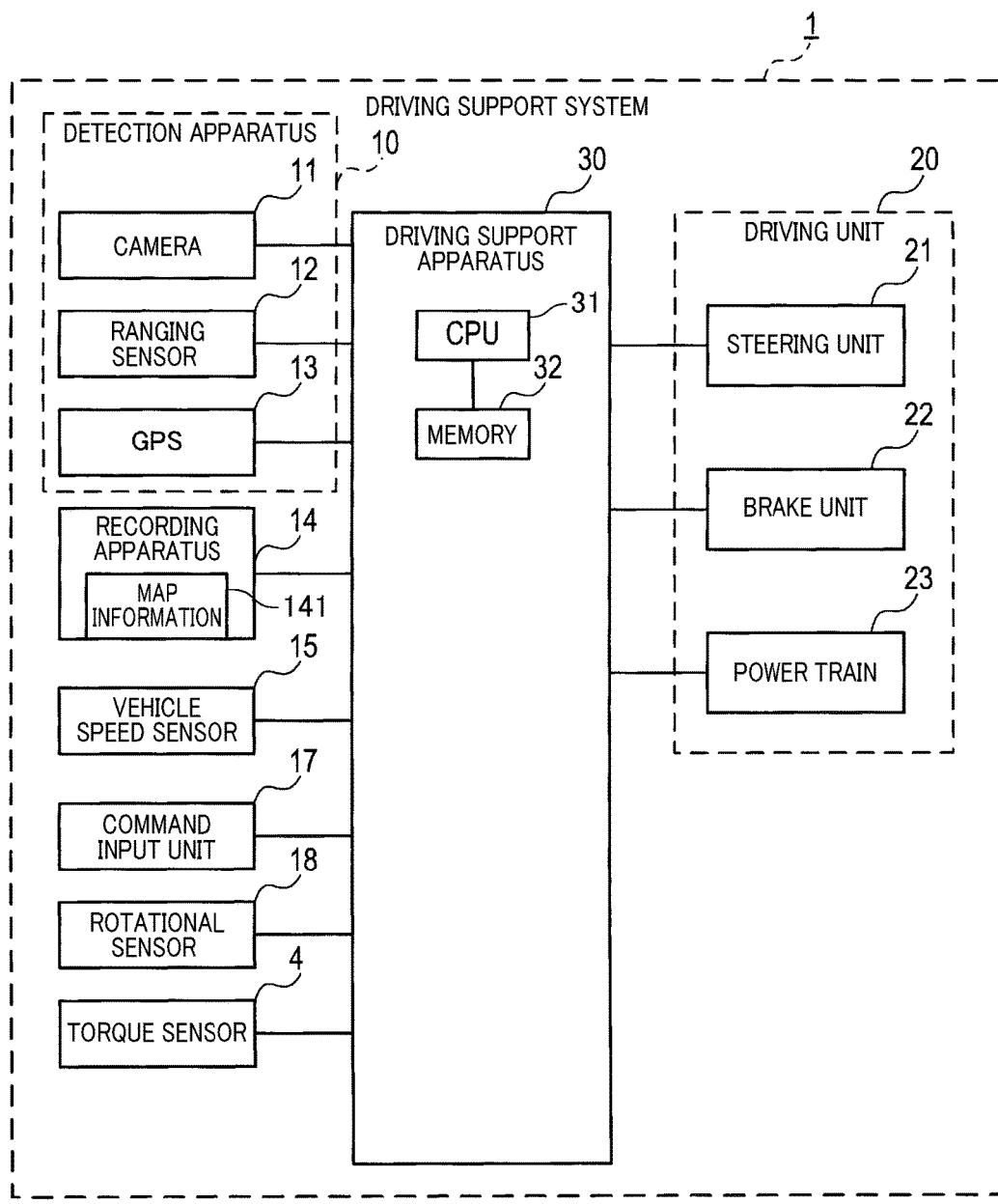
FIG. 1 is a block diagram showing a driving support system according to the first embodiment.

A driving support system 1 shown in FIG. 1 is mounted on a vehicle. In the following descriptions, a vehicle on which a drive support system 1 is mounted is also referred to as an own vehicle.

The driving support system 1 includes a detection unit 10, a recording apparatus 14, a vehicle speed sensor 15, an instruction input unit 17, a rotation sensor 18, a torque sensor 4, a driving unit 20 and a driving support apparatus 30.

The detection unit 10 is provided with a plurality of detection apparatus configured to detect a state of the vehicle or a state of the surrounding of the vehicle. The state of the vehicle refers to, for example, a location or a speed of the vehicle. The state of the surrounding of the vehicle includes, for example, a distribution of objects existing in the vicinity of the vehicle, position of lane markings on the road around the vehicle.

The detection unit 10 may include at least 2 detecting units from among a location detecting unit, a distance detecting unit, a left-right detecting unit. The location detecting unit detects the location of the vehicle. The distance detecting unit detects a distance between the vehicle and the surrounding objects of the vehicle. Here, the objects represent, for example, other vehicles, pedestrians, fixed objects or the like. The left-right detecting unit detects position of the vehicle in the left-right direction. Here, the left-right direction is defined as a left-right direction with respect to the advancing direction of the vehicle.

Specifically, the detection unit 10 is provided with a camera 11 as the left-right detecting unit, a ranging sensor 12 as the distance detecting unit, and a GPS unit 13 as the location detecting unit.

The camera 11 captures a region ahead of the own vehicle and outputs the captured image to the driving support apparatus 30. The captured region of the camera 11 includes a road surface ahead of the own vehicle.

The ranging sensor 12 is configured of a millimeter band wave sensor. The ranging sensor 12 may be configured of laser radar or LIDAR (light detection and ranging). The ranging sensor 12 detects objects existing in the vicinity of the own vehicle, and calculates the distance between the own vehicle and the object, azimuth of the object relative to the own vehicle, and the speed of the object.

The GPS unit 13 acquires location of the own vehicle. The recording apparatus 14 stores map information 141 or the like. The map information 141 includes information about the shape of the road, location of the road and the number of traffic lanes or the like.

The vehicle speed sensor 15 detects the speed of the own vehicle and outputs the detection result to the driving support apparatus 30. The instruction input unit 17 outputs a direction indicating signal to the driving support apparatus 30, when the driver of the vehicle operates the direction indicating unit. The direction indicating signal indicates the direction instructed by the direction indicating unit, that is whether left or right.

The rotational sensor 18 detects the motor rotational angle θ and the motor rotational angular velocity ω, and outputs the detection result to the driving support apparatus 30. The torque sensor 4 detects the steering torque Ts and outputs the detection result to the driving support apparatus 30.

The driving unit 20 controls the steering unit 21, the brake unit 22 and a power train 23 of the own vehicle, in accordance with a command from the driving support apparatus 30. The steering unit 21 performs steering operation of the own vehicle in accordance with the command of the driving support apparatus 30. The brake unit 22 operates the brake of the own vehicle in accordance with the driving support apparatus 30. The power train 23 is provided with an engine of the own vehicle, and a transmission mechanism that transmits the driving force of the engine to the driving wheel. The power train 23 operates in accordance with the command of the driving support apparatus 30.

The drive support apparatus 30 is mainly configured as a well-known microcomputer having CPU 31 and semiconductor memory devices (hereinafter referred to as memory 32) RAM, ROM and flash-memory or the like. Various functions in the driving support apparatus 30 are achieved by executing a program stored in a non-transitory substantial recording media by the CPU 31. In the example, the memory 32 corresponds to the non-transitory substantial recording media that stores the program. When the program is executed, methods corresponding to the program are executed. It should be noted that the number of microcomputer units that configure the driving support apparatus 30 may be one or more.

Figure 2:
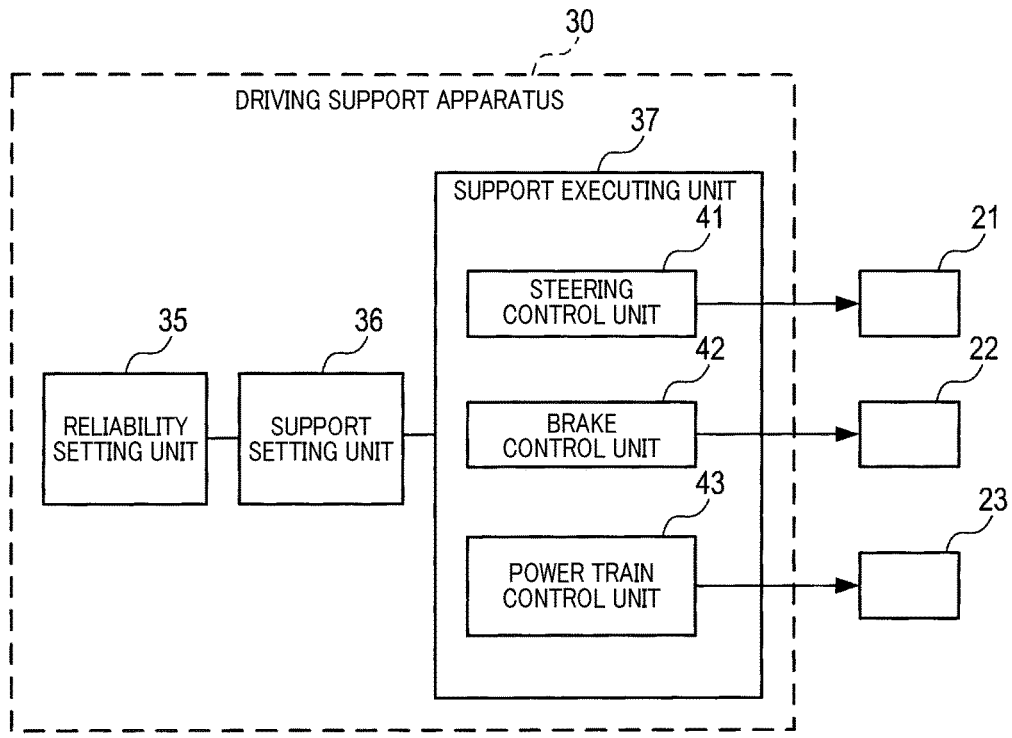
FIG. 2 is a block diagram showing functions of a driving support apparatus.

The driving support apparatus 30 includes, as a functional configuration achieved by executing the program by the CPU 31, a reliability setting unit 35, a support setting unit 36 and a support executing unit 37 as shown in FIG. 2.

Methods achieving elements that constitute the driving support apparatus 30 are not limited to software. However, one or more hardware devices can be used to achieve a part of elements or the whole elements. For example, in the case where the above-described functions are achieved by electronic circuits as hardware, the electronic circuits may be accomplished by digital circuits including many logic circuits or analog circuits or these combinations thereof.

The reliability setting unit 35 sets reliability for each detection apparatus included in the detection unit 10. Here, the reliability represents likelihood of the detection results of a plurality of detection apparatus included in the detection unit 10. In other words, the reliability represents likelihood of the detection results detected by the camera 11, the ranging sensor 12, and the GPS unit 13. The reliability is set within a range from 0 to 1 inclusive.

The reliability setting unit 35 may set the reliability as follows. For example, the reliability setting unit 35 may set the reliability of the camera 11 based on a degree of blur in the lane markings detected by the camera 11. In other words, the reliability setting unit 35 may set the reliability of the camera 11 such that the more significant the blurring in the detected lane markings, the lower the reliability. Here, the road markings include white lines or yellow lines that divide the road. For the method of detecting the lane markings from the image acquired by the camera 11, any publicly known methods can be used.

The reliability setting unit 35 may be configured to set the reliability considering running environment of the own vehicle. The running environment is defined as an environment that affects the detection accuracy, when detecting the lane markings from the image acquired by the camera 11. Specifically, the running environment includes a weather condition, e.g., whether it is rain or sunny, which are detected by sensors in a numerical form, and the reliability setting unit 35 sets the reliability by using the running environment in the numerical form. The sensors detecting the running environment include an illumination sensor and a rain sensor. The reliability setting unit 35 may set the reliability of the camera 11 such that the larger the detection accuracy for the running environment, the larger the reliability value becomes.

The reliability setting unit 35 may set the reliability of the ranging sensor 12, for example, based on a density of continuously existing observation point group which are detected by the ranging sensor 12. The reliability setting unit 35 may set the reliability of the ranging sensor 12 such that the larger the density, the larger the reliability value.

The reliability setting unit 35 may set the reliability of the GPS unit 13, for example, based on an intensity of the receiving signal. The reliability setting unit 35 may set the reliability of the GPS unit 13 such that the more the increase of the intensity of the receiving signal, the larger the reliability.

The calculation methods for the reliability of the camera 11, the ranging sensor 12 and the GPS unit 13 are not limited to the above-described methods, however, any publicly-known methods can be used. The support setting unit 36 executes a setting process which will be described later, sets the driving support to be performed, in accordance with the reliabilities set by the reliability setting unit 35 including the camera 11, the ranging sensor 12 and the GPS unit 13 and the correspondence information which will be described later, and outputs a command having the support executing unit 37 execute the driving support to be performed.

The support executing unit 37 executes a driving process in accordance with the command outputted by the support setting unit 36. The support executing unit 37 is provided with a steering control unit 41, a brake control unit 42 and a power train control unit 43.

The steering control unit 41 controls, when a command related to the steering operation from the support setting unit 36, the steering unit 21 so as to execute the command. The command related to the steering operation is defined as a command for a driving support to be executed for the steering operation.

The brake control unit 42 and the power train control unit 43 controls, when the support setting unit 36 outputs a command related to a vehicle speed, the brake unit 22, and the power train 23 so as to execute the command.

The command related to the vehicle speed is defined as a command for a driving support to be executed for the vehicle speed.

[1-2 Process]

Figure 3:
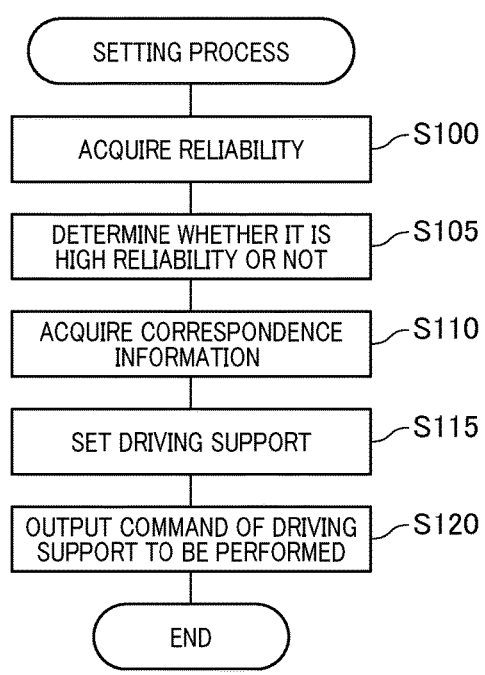
FIG. 3 is a flowchart showing a setting process.

Next, the setting process executed by the support setting unit 36 will be described with reference to the flow chart shown in FIG. 3. The setting process may be repeatedly executed at predetermined periods.

The support setting unit 36 acquires, at step S100, the reliability for each of the detection apparatus. In other words, the support setting unit 36 acquires reliabilities set by the reliability setting unit 35 for each of the camera unit 11, the ranging sensor 12 and the GPS unit 13.

At step S105, the support setting unit 36 determines whether or not each of the detection apparatus has high reliability (i.e., high reliability apparatus). The high reliability apparatus refers to a detection apparatus of which the reliability is predetermined reliability threshold or more. As described, the reliability is set to be within a range from 0 to 1 inclusive. The reliability threshold is stored in advance in the memory 32. According to the first embodiment, the reliability threshold is set to 0.5. However, the reliability threshold is not limited to this value, but may be set any value.

Specifically, the support setting unit 36 determines whether or not the reliability acquired at S100 is higher than or equal to the reliability threshold, for each of the camera 11, the ranging sensor 12 and the GPS unit 13, and records the detection apparatus having the reliability higher than or equal to the reliability threshold as a high reliability apparatus, into the memory 32. For example, when the reliability of the camera 11 is 0.9, the support setting unit 36 records the camera 11 into the memory 32 as the camera 11.

The support setting unit 36 acquires correspondence information at step S110. The correspondence information represents a correspondence between information about the plurality of detection apparatus such as the camera 11, the ranging sensor 12 and the GPS unit 13, where these apparatuses are determined as high reliability apparatus or not, and types of driving support to be performed. The correspondence information is stored in advance in the memory 32.

According to the first embodiment, as shown in FIG. 4, the correspondence table shows all combinations of reliabilities, i.e., 8 combinations, for respective detection apparatus such as the camera 11, the ranging sensor 12 and the GPS unit 13. Each of the 8 combinations includes types of driving support to be performed. In FIG. 4, high reliability apparatus are denoted as high and others are denoted as low.

The types of driving support to be performed is set as two divided groups such as a driving support related to the speed and a driving support related to the steering operation.

The driving support related to the vehicle speed refers to a control executed in a front/rear direction of the vehicle. The font/rear direction refers to the running direction of the vehicle and the opposite direction thereof. The driving support related to the vehicle speed includes an automatic speed control, for example. The automatic speed control represents a control related to the vehicle speed such that driving support apparatus 30 uses the driving unit 20 to perform the vehicle speed control, based on the detection result of the detection apparatus included in the detection unit 10. The automatic speed control may include an inter-vehicle distance maintenance and a deceleration support, for example.

The inter-vehicle distance maintenance is executed by the driving support apparatus 30, representing a control that maintains the inter-vehicle distance between the own vehicle and the preceding vehicle to be a predetermined distance. The inter-vehicle maintenance process is executed by using the detection result of the ranging sensor 12. The deceleration support is a control executed by the driving support apparatus 30, that is, a control that decelerates the vehicle when the own vehicle reaches a curved road or a road having downward gradient. The deceleration support is executed by using a detection result of the GPS unit 13 and the map information 141. Since such an inter-vehicle maintenance and a deceleration support are known art disclosed by various documents, detailed explanation will be omitted.

The driving support for the steering is a control executed in the horizontal direction of the vehicle. The horizontal direction is defined as left-right direction with respect to the vehicle running direction. The driving support related to the steering operation includes an automatic steering control and a support driving control, for example.

The automatic speed control represents a control related to the steering operation such that the driving support apparatus 30 uses the driving unit 20 to perform the steering operation, based on the detection result of the detection apparatus included in the detection unit 10. Specifically the process is accomplished by feedback control. The automatic steering control may include, for example, controls such as control of travelling within a lane (lane travelling), and control of a lane change. It should be noted that the traffic lane is also referred to simply as a lane.

The lane travelling is controlled by the driving support apparatus 30. The control of lane travelling refers to a controlling the location of the vehicle to be within a lane where the own vehicle is running. The control of the lane travelling is executed using the detection result of the ranging sensor 12. The control of the lane change is executed by the driving support apparatus 30, in which the location of the vehicle is changed to a lane to which the direction indicating unit indicates. The lane change is executed by using the detection result of the camera 11.

On the other hand, the driving support control represents a control related to the steering operation such that the driving support apparatus 30 uses the driving unit 20 to perform the steering operation, based on the detection result of the detection apparatus included in the detection unit 10. Specifically the control is accomplished by feed-forward control. The driving support control may include a control of a steering support, for example.

The steering support represents a control performed by the driving support apparatus 30, for changing the location of the vehicle to be in the center of the lane where the own vehicle runs. The steering support is executed by using the detection result of the GPS unit 13 and the map information 141. In the steering support, unlike the control of maintaining the location of the vehicle to be within the running lane, e.g., lane travelling, feedback control is not performed. Accordingly, depending on a situation of the road, the vehicle location may have an error with respect to the center of the lane where the own vehicle runs. The load of the driver increases in the order of automatic steering control, and the driving support control. The automatic steering control is also referred to as a target tracking control.

It should be noted that a manual operation refers to that the driver performs the speed control or the steering control manually. In other words, the manual operation described here refers to an operation where no automatic control is performed by the driving support apparatus 30. The automatic control is performed by the driving support apparatus 30 using the drive unit 20, based on the detection result of the detection apparatus included in the detection unit 10.

As shown in FIG. 4, in a control related to the steering operation, an assist control may always be executed regardless of the combination indicating high reliability apparatus or not.

The assist control controls the motor 6 to generate an assist torque that assists a steering operation of the driver in order to transfer a feeling of steering operation to the driver, such as heavy or light steering, based on the road surface reaction. The assist control is executed by using detection results of the torque sensor 4, the rotation sensor 18 and the vehicle speed sensor 15.

Since controls such as lane travelling, a lane change, an assist control are described in the second embodiment as well, detailed explanation will be omitted. The correspondence information may include a correspondence between information about the plurality of detection apparatus, where these apparatuses are determined as high reliability apparatus or not, and types of driving support to be performed using a detection result of at least one high reliability apparatus included in these apparatus.

For example, as shown in FIG. 4, a combination 1 includes the camera 11, ranging sensor 12 and GPS unit 13 which all have high reliability. In a driving support mode related to vehicle speed, for this combination of reliabilities, inter-vehicle distance maintenance uses the ranging sensor 12 and deceleration support uses the GPS 13. Also, a combination 2 where the camera 11 and the GPS unit 13 are high reliability apparatus is correlated to, in a driving support related to the vehicle speed, a deceleration support by using the detection result of the GPS unit 13, as a driving support to be performed.

Although it is not shown in FIG. 4, the correspondence information may correlate a driving support to be performed, by using all of the detection results of the high reliability apparatus included in the combinations. Moreover, in the correspondence information, a combination excluding the camera 11, but using the GPS unit 13 and the ranging sensor 12 each having reliability information, may be correlated to a type of a driving support to be performed in a driving support related to the vehicle speed. For example, the combinations are 1, 2, 3, 5, 6, and 7, in FIG. 4.

In the correspondence information, a combination of the GPS unit 13, the ranging sensor 12 and the camera 11 each having reliability information may be correlated to types of driving support related to a steering operation of the vehicle.

For example, as shown in the combinations 1 to 4 where at least the camera 11 is determined as a high reliability apparatus among the camera 11, the ranging sensor 12 and the GPS unit 13, lane travelling which uses the detection result of the camera 11 is correlated to these combinations as a driving support to be performed.

Moreover, for example, the combinations 1 and 3, where the camera 11 and the GPS unit 13 are high reliability apparatus are correlated to, in the driving support related to the steering operation, lane travelling using the detection result of the camera 11 and a lane change using the detection result of the GPS 13, as a driving support to be performed.

Furthermore, for example, the combinations 5 and 6, where the camera 11 is not high reliability apparatus and at least the GPS unit 13 is high reliability apparatus, is correlated to a steering support as a driving support to be performed in the driving support related to the steering operation.

In the correspondence information, without using combination having high reliability apparatus, combinations may be correlated to a type of driving support without using the detection result of high reliability apparatus. For example, the combinations 7 and 8, where both of the camera 11 and the GPS unit 13 are not high reliability apparatus are correlated to an assist control in the driving support related to steering operation.

Referring back to FIG. 3, the support setting unit 36 assigns, at step S115, a driving support to be performed, based on the reliabilities acquired at step S100 for the camera 11, the ranging sensor 12 and the GPS unit 13, and the correspondence information acquired at step S110.

At step S120, the support setting unit 36 outputs a command indicating a driving support to be performed, to the support executing unit 37. For example, when the driving support is set as a lane travelling and a lane change at step S115, the support setting unit 36 outputs a command to the support executing unit 37, indicating a driving support of the lane travelling and the lane change. Then the support setting unit 36 terminates the setting process.

[1-3 Operation]

According to the driving support system 1 thus configured, even in the case where any of the detection apparatuses in the camera 11, the ranging sensor 12 and the GPS unit 13, as driving apparatuses, do not have high reliability, driving support still can be operated corresponding to other combinations having high reliability apparatus.

Specifically, in the driving support system 1, in the case where at least one of the camera 11 and the GPS unit 13 has been determined as a high reliability apparatus among the plurality of detection apparatus, any of the driving support processes related to the speed is executed based on the correspondence information.

Also, according to the driving support system 1, when the camera 11 has been determined as a high reliability apparatus, the lane traveling as a driving support is executed. Further, according to the driving support system 1, in the case where at least the camera 11 and the GPS unit 13 have been determined as high reliability apparatus in the plurality of detection apparatus, the lane travelling and the lane change are executed as the driving support processes, based on the correspondence information.

In other words, according to the driving support system 1, even when any apparatus among the camera 11, the ranging sensor 12 and the GPS unit 13 is not determined as high reliability apparatus, all of the driving support processes are not stopped and not changed to a manual driving mode at once, but various automatic control are executed corresponding to the combination of rest of high reliability apparatus.

[1-4 Effects and Advantages]

According to the above-described first embodiment, the following effects and advantages can be obtained.

(1a) The driving support apparatus 30 is mounted on the vehicle and performs a plurality of driving supports. The support setting unit 36 acquires reliability representing a likelihood of the detection result for each of the plurality of detection apparatus which detect a state of the vehicle or a state of the surrounding of the vehicle. The support setting unit 36 determines whether or not each of the detection apparatuses is a high reliability apparatus having reliability higher than or equal to the predetermined reliability threshold. The support setting unit 36 acquires correspondence information representing a correspondence between the combination of detection apparatus including a state of apparatus if it is high reliability apparatus, and types of driving support to be performed.

The support setting unit 36 sets the driving support to be performed, based on a result of the determination whether or not respective detection apparatus is high reliability apparatus and the correspondence information. The support setting unit 36 outputs a command to have the support executing unit 37 execute the driving support to be performed.

Thus, the driving support apparatus 30 has a configuration in which types of driving support to be performed is determined in accordance with combinations of high reliability apparatus of which the reliability is a predetermined reliability threshold or more among the camera 11, the ranging sensor 12 and the GPS unit 13. Hence, even when any one of the camera 11, the ranging sensor 12 and the GPS unit 13 has a fault and is no longer the high reliability apparatus, a driving support corresponding to the current combination can be performed.

Therefore, even in the case where the reliability is lowered at any of a plurality of detection apparatus such as the camera 11, the ranging sensor 12 and the GPS 13, compared to a conventional art in which a driving support may be stopped because of the decline of the reliability, an increase of load of the driver can be suppressed according to the configuration of the present disclosure.

(1b) The correspondence information includes combinations and driving support to be performed by using detection result of at least one of high reliability apparatus which are correlated to each other. Thus, the driving support can be executed by using detection result of at least one of high reliability apparatus included in the combinations, whereby accurate driving support can be performed using the detection result of the high reliability apparatus.

(1c) The plurality of detection apparatus included in the driving support system 1 may include at least the GPS unit 13 that detects location of the vehicle, and the ranging sensor 12 that detects distance between the vehicle and objects in the surrounding of the vehicle. In the correspondence information, combination of the GPS unit 13 and the ranging sensor 12 among the plurality of detection apparatus, including the information whether or not each unit is high reliability apparatus, may be correlated to types of driving support related to the vehicle speed.

Therefore, when the types of driving support related to the speed is determined, acquired reliabilities of the GPS unit 13 and the ranging sensor 12 can be utilized.

(1d) The plurality of detection apparatus included in the driving support 1 may include at least 2 units among the GPS unit 13 that detects location of the vehicle, the ranging sensor 12 that detects a distance between the vehicle and objects in the surrounding of the vehicle, the camera 11 that detects location of the vehicle in the left-right direction. In the correspondence information, combination of the GPS unit 13, the ranging sensor 12 and the camera 11 among the plurality of detection apparatus, including the information whether or not each unit is high reliability apparatus, may be correlated to types of driving support related to the steering operation of the vehicle.

Thus, when the types of driving support related to the steering operation may be determined, acquired reliabilities of the GPS unit 13, the ranging sensor 12, and the camera 11 can be utilized.

2. Second Embodiment

Since the second embodiment is similar to the first embodiment in the fundamental configuration, different parts will be described in the followings. It should be noted that configurations having the same reference numbers as the first embodiment show the same configuration, and preceding explanations should be referred to.

According to the second embodiment, the steering control unit 41 may be configured to control the steering unit 21 based on the reliabilities corresponding to the camera 11 and the GPS unit 13. In the following descriptions, the reliabilities corresponding to the camera 11, the ranging sensor 12 and the GPS unit 13 are set by the reliability setting unit 35 within a range 0 to 1.

[2-1. Configuration]

<Steering Unit>

Figure 5:
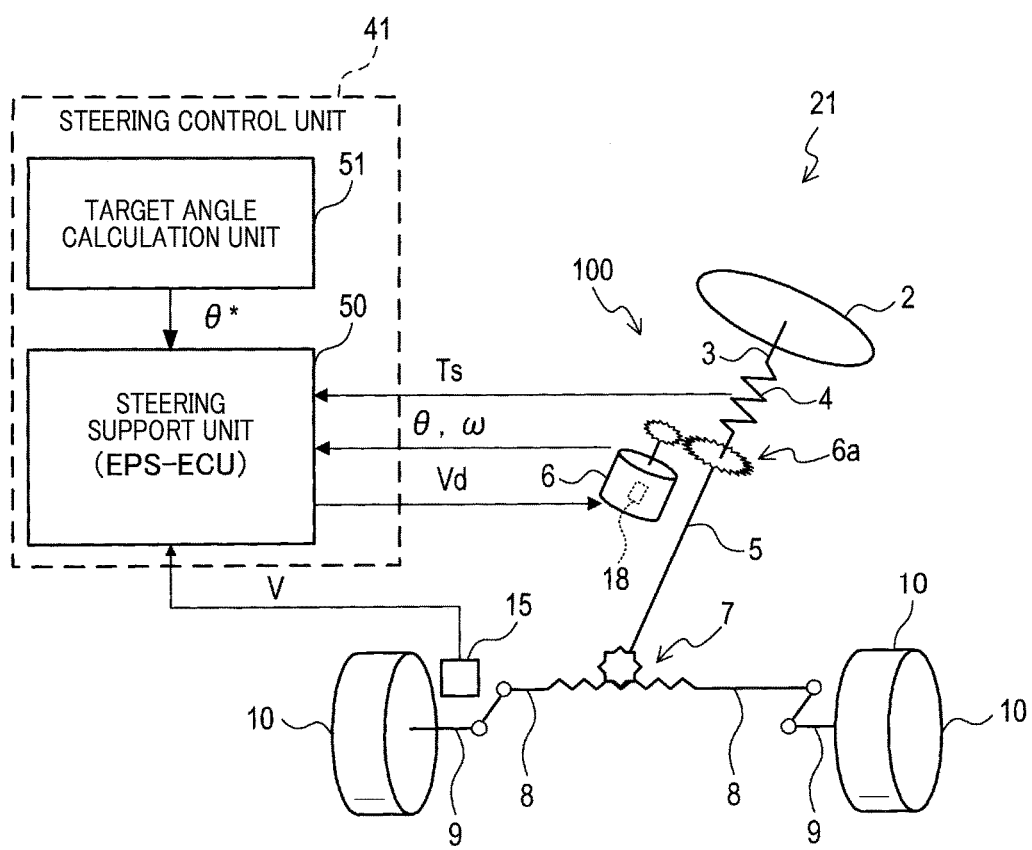
FIG. 5 is a diagram showing a configuration of a steering unit according to the second embodiment.

A configuration of the steering unit 21 is shown in FIG. 5. In the steering unit 21, the steering 2 is fixed to one end of the steering shaft 3 and the torque sensor 4 is connected to the other end of the steering shaft 3. At the other end of the torque sensor 4, an intermediate shaft 5 is connected. In the following descriptions, entire shaft from the steering shaft 3 to the intermediate shaft 5 via the torque sensor 4 is also referred to as a steering shaft.

The torque sensor 4 serves as a sensor detecting a steering torque Ts. Specifically, a torsion bar is provided, which couples the steering shaft 3 and the intermediate shaft 5, and detects a torque applied to the torsion bar based on a torsion angle thereof.

The motor 6 is for generating an assist torque based on the assist control, and a tracking torque based on a target tracking control, in which rotation thereof is transmitted to the intermediate shaft 5 via a reduction mechanism 6a. In other words, the reduction gear 6a is configured of a worm gear provided at a tip end of the rotational shaft of the motor 6, and a worm wheel provided co-axially to the intermediate shaft 5 as being engaged with the worm gear. Thus, the rotation of the motor 6 is transmitted to the intermediate shaft 5. Moreover, when the intermediate shaft 5 rotates due to an operation of the steering 2 or a reaction force of the road, i.e., road surface reaction force, the rotation is transmitted to the motor 6 via the reduction mechanism 6a to allow the motor 6 to rotate.

The motor 6 is configured of a brushless motor for example, and includes a rotation sensor such as resolver or the like inside thereof. The rotation sensor outputs, at least, a motor rotational angle $\theta$, and a motor rotation angular velocity $\omega$. However, instead of using the motor rotational angle $\theta$, and a motor rotation angular velocity $\omega$, a steering angle or a steering angular velocity may be used in which the motor angle $\theta$, and a motor rotation angular velocity $\omega$ are multiplied by a gear ratio of the reduction gear 6a.

In the intermediate shaft 5, opposite end with respect to one end connected to the torque sensor 4 is connected to a steering gear box 7. The steering gear box 7 is configured of a gear mechanism including a rack and a pinion, where tooth of the rack meshes with the pinion gear disposed at the opposite end of the intermediate shaft 5. Accordingly, when the driver rotates the steering 2, the intermediate shaft 5 rotates, that is, the pinion gear rotates, whereby the rack moves in the left-right direction. At the both ends of the rack, tie-rods 8 are attached, and move in the left-right direction together with the rack. Thus, the tie-rods 8 pull or push the knuckle arm 9, thereby changing the direction of each of tires 10.

The vehicle speed sensor 15 that detects vehicle speed V is provided at specified portion of the vehicle. Hereinafter, a mechanism that transmits the steering power of the steering 2 from the steering 2 to each tire 10 is referred to as a steering system mechanism 100.

In the steering system mechanism 100 having the above-mentioned configuration, when the steering 2 is rotated by the steering operation of the driver, the rotation is transmitted to the steering gear box 7 via the steering shaft 3, the torque sensor 4, and the intermediate shaft 5. Then, the rotation of the intermediate shaft 5 is converted to a movement in the left-right direction of the tie-rod 8. As a result, both left and right tires 10 are steered by the movement of the tie-rod 8.

<Steering Control Unit>

Figure 6:
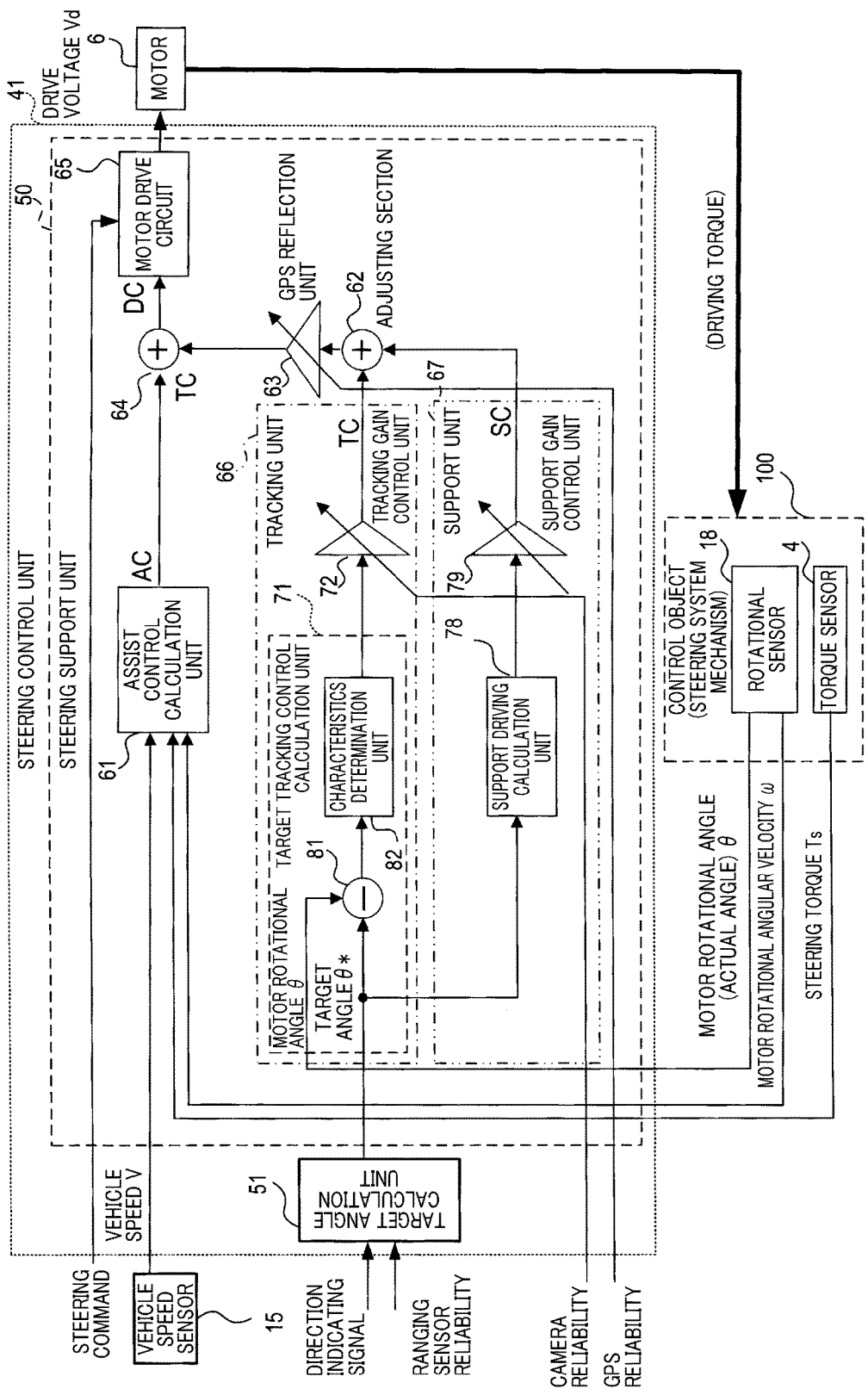
FIG. 6 is a diagram showing a configuration of a steering assist unit.

As shown in FIG. 6, the steering control unit 41 is provided with a target angle calculation unit 51 and a steering assist unit 50. The steering assist unit 50 may be configured of EPS-ECU. The EPS is an abbreviation of electric power steering. ECU is an abbreviation of electronic control unit.

<Target Angle Calculation Unit>

The target angle calculation unit 51 detects the traffic lane and location of the own vehicle in the traffic lane in accordance with images ahead of the vehicle which are captured by the camera 11. Then, in accordance with the detected location, the target angle calculation unit 51 sets the target course to have the own vehicle run in the traffic lane. Further, the target angle calculation unit 51 sets, based on detection values of the vehicle speed or the steering angle or the like, a control amount in order to have the own vehicle run along the target course, that is, the own vehicle runs in the traffic lane.

The target angle calculation unit 51 sets the control amount in order to have the own vehicle change the traffic lane, based on the images ahead of the vehicle captured by the camera 11, a distance between the own vehicle and the preceding vehicle acquired by the ranging sensor 12 acquired by the ranging sensor 12, and a relative speed or the like.

The target angle calculation unit 51 sets, as a control amount for executing the lane travelling and the lane change as the driving support, the target angle $\theta^*$ which is a target value of the steering angle $\theta$ and outputs the target angle $\theta^*$ to the steering assist unit 50.

According to the second embodiment, the target angle calculation unit 51 executes a target angle setting process so as to set the target angle $\theta^*$ for executing lane travelling as the driving support. Also, the target angle calculation unit 51 sets the target angle $\theta^*$ for executing the lane change as the driving support, only when the ranging sensor 12 is determined as a high reliability apparatus.

It should be noted that the function included in the target angle calculation unit 51 can be achieved by not only software but also one or more hardware devices for a part or entire elements of the function.

With reference to the flowchart shown in FIG. 7, hereinafter will be described a target angle setting process executed by the target angle calculation unit 51. In the target angle setting process, since the process for setting the target angle $\theta^*$ is well-known process in control of the lane traveling or the lane change, detailed explanation will be omitted in the following description.

The target angle calculation unit 51 acquires reliability of the ranging sensor 12. The reliability of the ranging sensor 12 may be acquired by the reliability setting unit 35. The target angle calculation unit 51 determines, at S210, whether or not the ranging sensor 12 is a high reliability apparatus. The target angle calculation unit 51 proceeds to step S220 when the ranging sensor 12 is determined as a high reliability apparatus, and proceeds to step S230 when the ranging sensor 12 is not determined as a high reliability apparatus.

The target angle calculation unit 51 determines, at step S220, whether or not a command (hereinafter referred to as a lane change command) from the driver, to perform a lane change of the own vehicle is present. Specifically, the target angle calculation unit 51 determines that the lane change command is present when the direction indicating signal is accepted by the instruction input unit 17. The target angle calculation unit 51 proceeds to step S240 when it is determined that the lane change command is present, and proceeds to step S230 when it is determined that the lane change command is not present.

The target angle calculation unit 51 sets the target angle θ* used for executing the lane travelling as a driving support, at step S230 which is a step executed when the lane change command is not present. Then, the target angle calculation unit 51 terminates the target angle process. It should be noted that the target angle calculation unit 51 may notify the driver that lane change driving support is not available due to low reliability of the ranging sensor 12.

The target angle calculation unit 51 sets the target angle θ* used for executing the lane change as the driving support at step S240 which is a step executed when the lane change command is present. Then, the target angle calculation unit 51 terminates the target angle setting process.

Thus, in the case where the ranging sensor 12 is a high reliability apparatus, the target angle θ* is set for executing the driving support of the lane change. Also, in the case where the ranging sensor 12 is not high reliability apparatus, the target angle θ* is set for executing the driving support of the lane traveling.

<Steering Assist Unit>

As shown in FIG. 6, the steering assist unit 50 calculates a final command DC, based on the target angle θ* set by the target angle calculation unit 51, the steering torque Ts detected by the torque sensor 4, the motor rotational angle θ*, the motor rotation angular velocity ω from the motor 6 and the vehicle speed V detected by the vehicle speed sensor 15.

The final command DC is a sum of the assist command AC and the tracking command TC. The assist command AC is a control value for executing the assist control, representing a current command value to allow the motor 6 to generate an assist torque that reduce the steering load.

The tracking command TC is a control value for executing the lane travelling or the lane change, representing a current command value used to allow the motor 6 to generate the tracking torque, where the detection value of physical quantity related to the steering is tracked to the target value of the physical quantity thereof. The target value of the physical value related to the steering refers to the target angle θ*. The physical quantity related to the steering refers to a steering angle. The steering angle may be a motor rotational angle or other parameter which varies depending on the steering sensor or the steering angle. In the following descriptions, the steering angle or the motor rotational angle are also referred to as an actual angle θ.

According to the second embodiment, the tracking command TC may include a component of a support command SC. The support command SC refers to a control value for executing the steering support, representing a current command that allows the motor 6 to generate the support torque which is a torque depending on the target angle θ*.

The steering assist unit 50 applies a drive voltage Vd in accordance with the final command DC to the motor 6, thereby generating the assist torque and the tracking torque. The tracking torque may include a component of the support torque.

The steering assist unit 50 controls the motor 6 by the drive voltage Vd, thereby controlling the steering characteristic and the steering system mechanism 100 driven by the motor 6.

The steering assist unit 50 includes an assist control calculation unit 61, a tracking unit 66, a support unit 67, an adjusting unit 62, a GPS reflection unit 63, an adder unit 64 and a motor drive circuit 65. The assist control unit calculation unit 61 generates an assist command AC.

The tracking unit 66 multiplies the tracking command TC generated by the target tracking control calculation unit 71 by a tracking gain α which will be described later, thereby generating a new tracking command TC, and outputs the new tracking command to the adjusting unit 62. The new tracking command TC is expressed by α·TC.

The supporting unit 67 multiplies the support command SC generated by the support driving calculation unit 78 by a support gain β which will be described later, thereby generating a new support command SC, and outputs the new support command SC to the adjusting unit 62. The new support command SC is expressed by β·SC.

The adjusting unit 62 adds the support command SC outputted by the support unit 67 to the tracking command TC outputted by the tracking unit 66, to obtain a new tracking command TC, and outputs the new tracking command TC to the GPS reflection unit 63. The new tracking command TC is expressed by α·TC+β·SC.

The GPS reflection unit 63 sets a larger reliability value between the camera 11 and the GPS unit 13 to be a gain γ, multiplies the tracking command TC transmitted from the adjusting unit 62 by the gain γ to obtain a new tracking command TC, and outputs the new tracking command TC to the adder unit 64. The new tracking command TC is referred to as γ (α·TC+β·SC).

The adder unit 64 outputs the value where the tracking command TC is added to the assist command AC, as the drive command DC, to the motor drive circuit 65. The motor drive circuit 65 applies the drive voltage Vd to the motor 6 based on the drive command DC, thereby driving the motor 6.

It should be noted that functions of the assist control calculation unit 61, the tracking unit 66, the support unit 67, the adjusting unit 62, the GPS reflection unit 63, and the adder unit 64 may be achieved by executing a specified control program by a CPU (not shown) included in the steering assist unit 50.

In this case, to secure required responsiveness for the lane travelling, the above-mentioned control program is executed at any period. The period for executing the program can be any value within several hundreds of micro-seconds to several hundreds of mille-second as long as no problems arise for executing the lane travelling.

The steering assist unit 50 is configured to update the drive signal DC at the above-mentioned period. However, the above-described units are accomplished by software, as an example, but these units may be accomplished by hardware units such as logic circuits, for example.

<Motor Drive Circuit>

The motor drive circuit 65 applies the drive voltage Vd to the motor 6 based on the drive signal DC, so as to apply torque in response to the drive signal DC to the steering shaft. Specifically, the drive command DC is set to be the target current, and the drive voltage Vd is feedback-controlled such that current Inn flowing through the motor 6 becomes the target current, thereby generating a desired torque to the steering shaft. The motor drive circuit 65 configured as described above is a known art disclosed by JP-A-2013-52793, for example, detailed explanation thereof is omitted.

<Assist Control Calculation Unit>

The assist control calculation unit 61 generates an assist command AC, based on the steering torque Ts, the motor rotational angular velocity ω and the vehicle speed V or the like. The assist command AC refers to a torque that assists an operation of the steering 2 so as to accomplish a sense of the road surface, depending on the road surface reaction. The road surface reaction is also referred to as road load.

The assist control calculation unit 61 may calculate a basic assist amount to obtain a sense of the road surface depending on the road surface reaction, based on the steering torque Ts and the vehicle speed V, thereby generating the basic assist amount as the assist command AC. The method of calculating the assist command AC is not limited to this method. However, any known method can be used for this method.

<Tracking Unit>

The tracking unit 66 is provided with the target tracking control calculation unit 71 and a tracking gain control unit 72. The target tracking control calculation unit 71 generates a tracking command TC based on the target angle θ* and the actual angle θ. The tracking command TC refers to a current command value that generates a required torque for the actual angle θ in order to track the target angle θ*.

The target tracking control calculation unit 71 is provided with a deviation calculation unit 81 and a characteristics determination unit 82. The deviation calculation unit 81, in response to a command related to the steering operation from the support setting unit 36, calculates a deviation between the actual angle θ and the target angle θ*. The characteristics determination unit 82 adds a PID gain to the output of the deviation calculation unit 81, thereby determining the control characteristics of the PID control.

Figure 8:
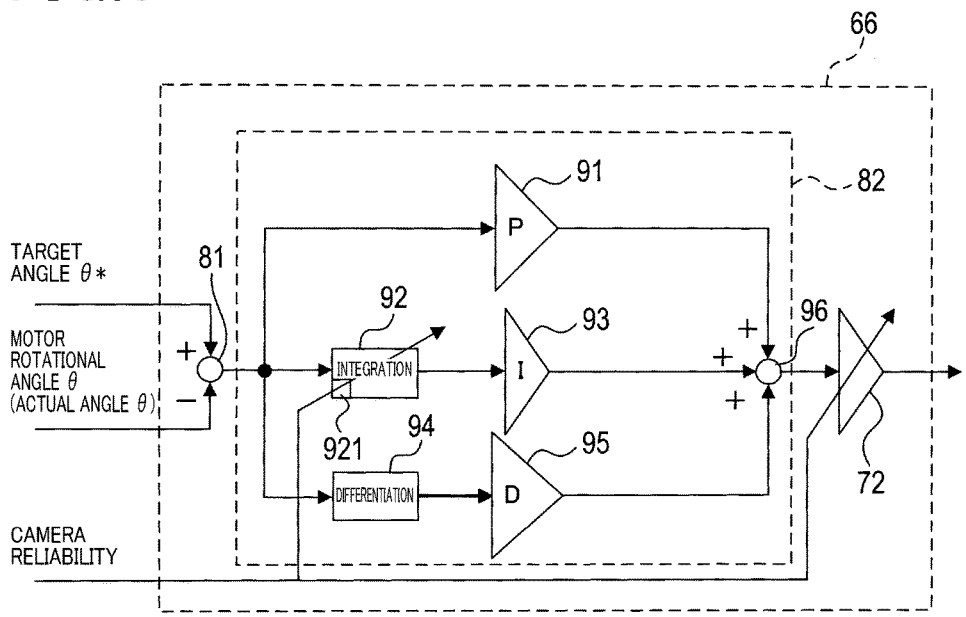
FIG. 8 is a diagram showing a characteristic determination unit.

As shown in FIG. 8, the characteristics determination unit 82 is provided with a proportion unit 91, an integral unit 92, an integral gain applying unit 93, a differential unit 94 and differential gain applying unit 95 and an adder unit 96. The proportion unit 91 generates a proportional value which is proportional to the deviation.

The integral unit 92 generates an integral value where the deviation is integrated to be less than an integration upper limit which is a predetermined upper limit set by the integration limitation unit 921. The integration limitation unit 921 may be configured to restrict the integration upper limit depending on the reliability of the camera 11.

For example, the integration limitation unit 921 may be configured to generate a new integration upper limit calculated such that a predetermined integration upper limit is multiplied by an acquired reliability of the camera 11. Also, for example, the integration limitation unit 921 may be configured such that the higher the reliability of the camera 11, the larger the integration upper limit.

Thus, windup phenomena in the integral calculation can be suppressed. The integration limitation unit 921 may be configured to generate the integration upper limit using a value which is determined regardless of the reliability of the camera 11.

The integral gain applying unit 93 outputs a new integral value where the integral value from the integration unit 92 is multiplied by an integral gain. The differential unit 94 generates a differential value where the deviation is differentiated. The differential gain applying unit 95 outputs a new differential value, where the differential value outputted by the differential unit 94 is multiplied by the differential gain.

The adder unit 96 sums the proportional value, the integral value and the differential value and outputs the summed value to the tracking gain control unit 72 as the tracking command TC. The tracking gain control unit 72 multiplies the accepted value and the predetermined gain and outputs the multiplied value. Specifically, the tracking gain control unit 72 sets the tracking gain α, and outputs a value, where the tracking control command TC is multiplied by the tracking gain α, to the adjusting unit 62 as a new tracking command TC.

The tracking gain α is a gain which is set such that the lower the reliability of the camera 11, the smaller the gain value. According to the second embodiment, the reliability of the camera 11 is set within a range of 0 to 1 inclusive. The tracking gain control unit 72 sets the acquired reliability of the camera 11 to be the tracking gain α.

Thus, the tracking unit 66 outputs the new tracking command TC being set such that the higher the reliability of the camera 11, the larger the command value is. It should be noted that the tracking gain is set within a range of 0 to 1 inclusive, so that the value of the new tracking command TC outputted by the tracking unit 66 does not exceed the value of the tracking command TC generated by the target tracking control calculation unit 71.

<Support Unit>

As shown in FIG. 6, the support unit 67 is provided with the support driving calculation unit 78 and the support gain control unit 79.

Generally, mechanical impedance defines a relationship between force F applied to an object and a displacement x of the object. The relationship is expressed by an equation (1) as follows.

$$F = K_x + \dot{C}x + \dot{I}\dot{x} \quad (1)$$

K* refers to a rigid component of the mechanical impedance, C* refers to a viscous component of the mechanical impedance, and I* refers to an inertia component of the mechanical impedance. For the rotational movement, in the equation (1), when assuming that the force F applied to the object is a torque T and a displacement amount x of the object is a rotational amount θ, a relationship expressed in the following equation (2) is satisfied.

$$T = K_x + \dot{C}\theta + \ddot{I}\theta \quad (2)$$

K corresponds to a rigid component of K* of the mechanical impedance, C corresponds to the viscous component C* of the mechanical impedance, and I corresponds to inertia component I* of the mechanical impedance.

Figure 9:
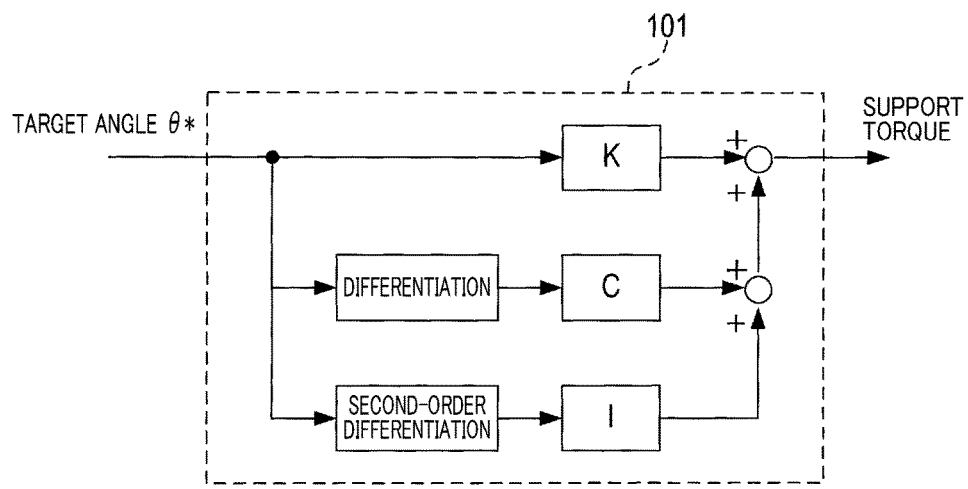
FIG. 9 is a diagram showing an invert model of a steering system mechanism.

The forward model of the steering system mechanism 100 is defined such that the rotational amount θ and the torque T in the equation (2) are replaced to the target angle θ* and the support torque respectively. According to the second embodiment, the support driving calculation unit 78 may employ a configuration in which a support torque is calculated from the target angle θ*, by using an invert model 101 of the steering system mechanism 100 shown in FIG. 9, and current control value is generated as the support command SC in order to generate the support torque by the motor 6.

The support gain control unit 79 sets the support gain, and multiples the support command DC outputted by the support driving calculation unit 78 by the support gain β so as to obtain new support command SC, and outputs the new support command SC to the adjustment unit 62. The support gain β decreases as the reliability of the camera 11 increases.

According to the second embodiment, the support gain control unit 79 sets the support gain β to be a value in which the reliability of the camera 11 is subtracted from 1. Since the reliability of the camera 11 is set within a range from 0 to 1 inclusive, the support unit 67 outputs the support command SC such that the higher the reliability of the camera 11, the smaller the value of the support command SC. The new support command SC outputted by the support unit 67 does not exceed the support command SC generated by the support driving calculation unit 78.

[2-2. Operation]

The driving support apparatus 30 thus configured is described as follows.

First, a case will be described, where the GPS unit 13 has reliability set by 1.

Assuming that reliability 1 is acquired for the camera 11, the tracking command TC to be outputted to the adder unit 64 does not include the support command SC, and the tracking command TC calculated by the target tracking control calculation unit 71 is directly outputted to the adder unit 64. Thus, when the reliability of the camera 11 is 1 and the reliability of the GPS unit 13 is 1, the drive command DC is outputted, where the drive command DC is the sum of the tracking command TC and the assist command AC, used for executing the target tracking control such as lane travelling or a lane change. Thus, an automatic steering control such as a lane traveling or a lane change is executed together with the assist control.

On the other hand, when the reliability of the camera 11 is 0, the tracking command TC outputted from the tracking unit 66 becomes 0 so that the new tracking command TC outputted by the adder unit 64 becomes the support command SC generated by the support gain control unit 79. Thus, in the case where the reliability of the camera 11 is 0 and the reliability of the GPS unit 13 is 1, the drive command DC is outputted as a value where the support command SC and the assist command AC are summed which are control values for executing the steering support. Thus, support driving control such as a steering support is executed together with the assist control.

Subsequently, a case will be described in which the reliability of the GPS unit 13 is acquired as 0. When the reliability of the GPS unit 13 is acquired as 0 and the reliability of the camera 11 is acquired as 1, the drive command DC is outputted as a value where the tracking command TC and the assist command AC are summed which are control values for executing the lane travelling. Hence, an automatic steering control such as a lane travelling is executed together with the assist control.

When the reliability of the GPS unit 13 is acquired as 0 and the reliability of the camera 11 is acquired as 0, the support command SC is outputted from the adjusting unit 62, as the tracking command TC. However, the GPS reflection unit 63 outputs a value where the support command SC is multiplied by 0, that is, 0 is outputted to the adder unit 64 as the new tracking command TC. Accordingly, only the assist control is executed.

In the case where the reliability of the camera 11 is larger than 0 and less than 1, the tracking command TC to be outputted to the adder unit 64 includes a component of the support command SC. As the reliability of the camera 11 increases, the ratio of the component of the support command SC to the tracking command TC outputted to the adder unit 64, becomes smaller.

When the reliability of the camera 11 is acquired as a value of 0.5 or more, the current command value is mainly outputted for executing an automatic steering control such as the lane traveling or the lane change. Thus, a driving support which is close to the automatic steering support is executed together with the assist control. On the other hand, as reliability of the camera 11, when a value less than 0.5 is acquired, the current command value for executing the steering support is outputted. Thus, a driving support close to the steering support is executed together with the assist control.

[2-3. Effects and Advantages]

According to the second embodiment described in the above, the above-described effects of the first embodiment (1a), (1b) and (1d) are obtained, and further, the following effects can be obtained as well.

(2a) The plurality of detection apparatus may include at least the camera 11 which detects the position of the vehicle in the left-right direction. The support execution unit 37 may include steering assist unit 50. The steering assist unit 50 may be configured to execute, when the support setting unit 36 as an output unit outputs a command related to a steering operation, a driving support related to the steering operation, in accordance with the command related to the steering operation outputted by the support setting unit 36.

The steering assist unit 50 may include the target tracking control calculation unit 71, the motor driving circuit 65, and a tracking gain control unit 72. The target tracking control calculation unit 71 may be configured to calculate the tracking command TC representing a control value to allow the motor 6 of the steering to generate a tracking torque, when the command related to the steering is outputted, where the tracking torque is used such that the detection value of physical quantity tracks the target value of the physical quantity, which are related to the steering operation. The motor drive circuit 65 may be configured to output the tracking command TC to the motor 6. The tracking gain control unit 72 may be configured to multiply the inputted value and a predetermined gain, and output the multiplied value.

The tracking gain control unit 72 may be configured to set a tracking gain $\alpha$ where the lower the reliability of the camera 11, the smaller the value, multiply the tracking command TC by the tracking gain $\alpha$, and output the multiplied value as a new tracking command TC. The motor driving circuit 65 may be configured to output the new tracking command TC as the tracking command TC.

Accordingly, the driving support apparatus 30 controls the motor 6 to generate the tracking torque with the tracking command TC being set such that the lower the reliability of the camera 11, the smaller ratio of the tracking command TC. Hence, when the camera 11 has low reliability, the target tracking control such as the lane traveling or the lane change based on the tracking torque, that is, an automatic operation control can be performed taking the low reliability into account. Specifically, when the camera 11 has low reliability, driving support such as a lane travelling or a lane change can be disabled.

(2b) The steering assist unit 50 may be provided with an assist control calculation unit 61 as an assist command unit. The assist control calculation unit 61 may be configured to acquire an assist command AC as an assist control value representing a control value for generating an assist torque at the motor 6 to reduce steering load. The motor drive circuit 65 may be configured to output a value where the tracking command TC is added to the assist command AC.

According to this configuration, since the value where the tracking command TC is added to the assist command AC is outputted as the control value, an assist control together with the target tracking control, that is, an automatic steering control can be performed.

(2c) The steering assist unit 50 may further include the support driving calculation unit 78, the support gain control unit 79 and the adjusting unit 62. The support driving calculation unit 78 may be configured to calculate a support command SC as a support control value indicating a control value for generating a support torque at the motor 6, where the support torque indicates a torque depending on the target angle θ* as a target value of the physical quantity related to the steering. The support gain control unit 79 sets a support gain β such that the higher the reliability of the camera 11, the smaller the support gain is, and multiplies the support command SC by the support gain β so as to output new support command SC. The adjusting unit 62 may be configured to output a value where the support command SC is added to the tracking command TC as a new tracking command TC. The motor drive circuit 65 may be configured to output a new tracking command TC.

Thus, torque can be generated by the motor 6 such that when the reliability of the camera 11 is high, the tracking torque is mainly generated, and when the reliability of the camera 11 is low, the support torque is mainly generated. As a result, when the reliability of the camera 11 is high, the lane travelling and the lane change are performed as a driving support, and when the reliability of the camera 11 is low, the steering support is mainly performed.

According to this configuration, when the reliability of the camera 11 is gradually decreased, a main content of the driving support may be gradually changed from the lane travelling to the steering support.

(2d) The reliability of the camera 11 may be set within a range from 0 to 1 inclusive. The tracking gain control unit 72 may be configured to set the reliability of the camera 11 to be the tracking gain α. The support gain control unit 79 may be configured to set a value in which the reliability of the camera 11 is subtracted from 1, to be the support gain β. According to this configuration, similar effects to the above-described (2d) can be obtained.

[2-4 Modification]

The second embodiment may be modified as follows.

<Modification 1>

Tracking gain control unit 72 may be configured such that the tracking gain α is set to be 1, when the camera 11 is a high reliability apparatus, and is set to be 1, when the camera 11 is not a high reliability apparatus. The support gain control unit 79 may be configured such that the support gain β is set to be 0 when the camera 11 is a high reliability apparatus, and is set to be 1 when the camera 11 is not high reliability apparatus.

According to this configuration, types of driving support to be performed can be determined. In other words, the driving support apparatus 30 can perform the driving support as described in the correspondence information shown in FIG. 4.

<Modification 2>

According to the above-described embodiments, in the tracking unit 66, the tracking gain control unit 72 multiplies a subject value by the tracking gain α, where the subject value is a tracking command TC calculated by the target tracking control calculation unit 71, and outputs the multiplied value as a new subject value. However, it is not limited to this configuration.

The tracking gain control unit may be configured in the following manner. The tracking gain α is set such that the lower the reliability of the camera 11, smaller the value of the tracking gain α. A subject value representing at least one of, in the tracking unit 66, a target value, a detection value, a deviation, a proportion value, an integral value, an integral upper limit, a differential value and a summed value, is multiplied by the tracking gain α to obtain a new subject value, and the new subject value is outputted. The subject value refers to a value used for a calculation in the latter part.

Hereinafter, modifications of the tracking gain control unit 72 will be described.

Figure 10:
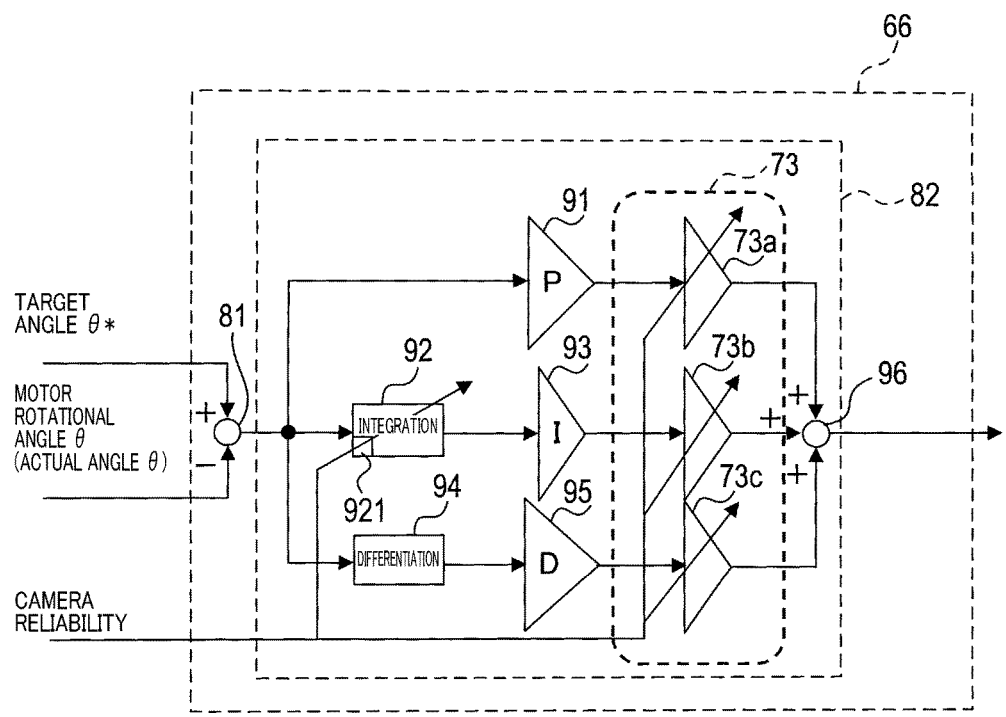
FIG. 10 is a diagram showing a configuration of a tracking unit according to the second embodiment.

As shown in FIG. 10, the tracking gain control unit 73 may be configured such that the subject values, which are the proportion value, the integral value, the differential value in the characteristics determination unit 82, is multiplied by the tracking gain α to obtain new subject value and the new subject value is outputted.

Specifically, the tracking gain control unit 73a may output a value as a new proportional value, where the proportional value from the proportion unit 91 is multiplied by the tracking gain α, to the adder unit 96. The tracking gain control unit 73b may output a value as a new integral value, where the integral value from the integral gain applying unit 93 is multiplied by the tracking gain α, to the adder unit 96. The tracking gain control unit 73c may output a value as a new differential value, where the differential value from the differential gain unit 95 is multiplied by the tracking gain α, to the adder unit 96.

According to this modification, similar effects and advantages to the second embodiment can be obtained. Also, in the modification, each of components of the tracking command TC, such as the proportional component, the integral component and the differential component are restricted. Hence, when applications using these outputs are present, interference with these applications can be suppressed. It should be noted that "these outputs" refers to any of the proportional component, the integral component, and the differential component. Since there is are the above-mentioned effects of reducing the interference, versatility of the software architecture can be enhanced.

<Modification 3>

According to the modification 3, each configuration of adding PID gain and the tracking gain control unit 73 in the characteristics determination unit 82 of the modification 2 may be integrated.

Figure 11:
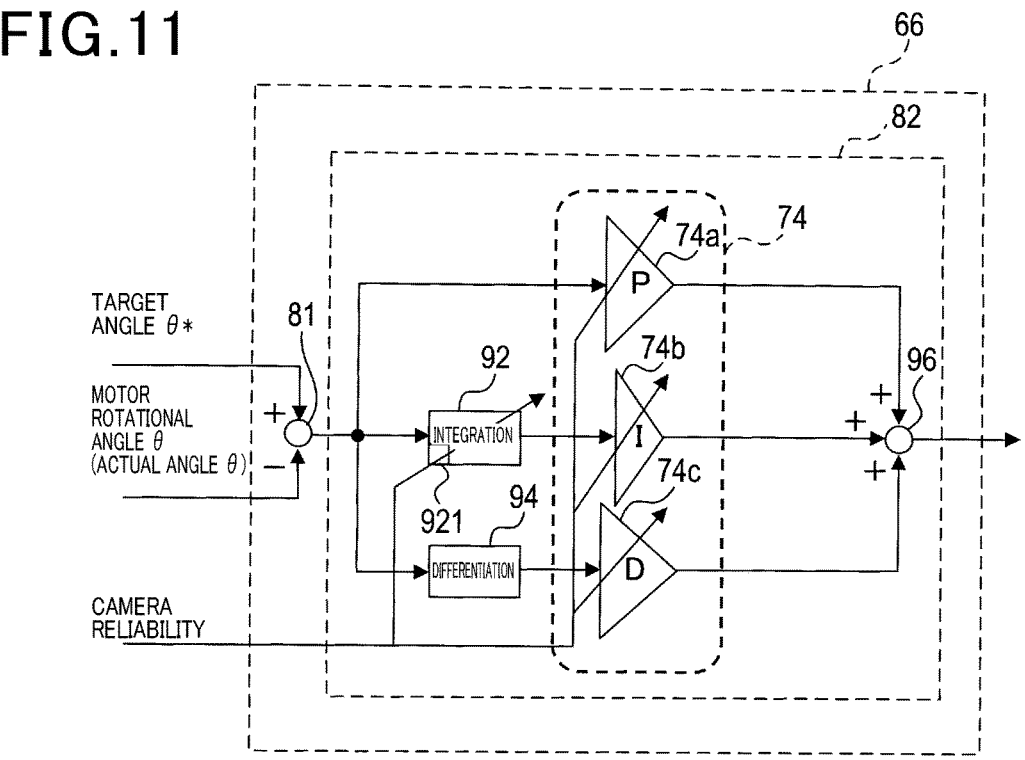
FIG. 11 is a diagram showing a configuration of a tracking unit according to the third embodiment.

Specifically, as shown in FIG. 11, the proportion unit 91 and the tracking gain control unit 73a shown in FIG. 10 may be integrated to constitute a tracking gain control unit 74a. Similarly, the integral gain applying unit 93 and the tracking gain control unit 73b shown in FIG. 10 may be integrated to constitute the tracking gain control unit 74b. Further, the differential gain applying unit 95 and the tracking gain control unit 73c shown in FIG. 10 may be integrated to constitute the tracking gain control unit 74c.

Thus, according to this modification provided with the tracking control unit 74, similar effects and advantages to the modification 2 can be obtained.

<Modification 4>

Figure 12:
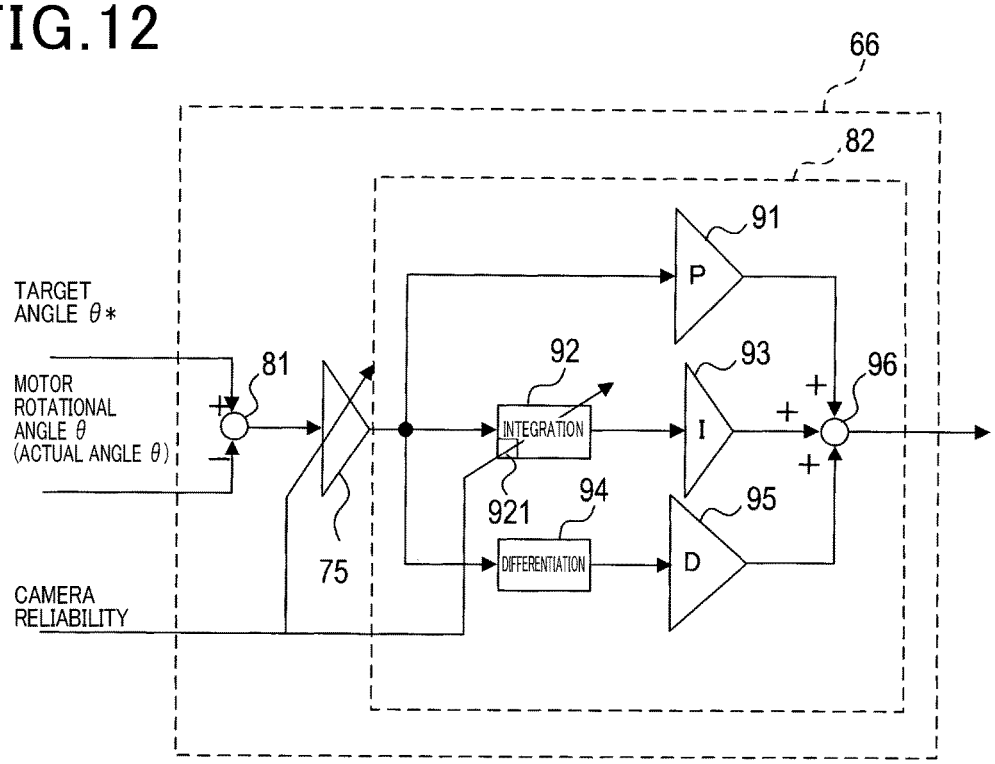
FIG. 12 is a diagram showing a configuration of a tracking unit according to the fourth embodiment.

In the modification 4, as shown in FIG. 12, the tracking gain control unit 75 may be configured such that a deviation outputted from the deviation calculation unit 81 as the subject value is multiplied by the tracking gain α and the multiplied value is outputted as a new subject value.

Specifically, the tracking gain control unit 75 may multiply the deviation from the deviation calculation unit 81 by the tracking gain α and output the multiplied value to the characteristics determination unit 82. According to this modification, similar effects and advantages to the second embodiment can be obtained. Also, according to this modification, compared to the second embodiment, since the values are restricted on the upstream side, when other applications using the output are present, interference to the applications can be suppressed.

Here, 'output' refers to a deviation between the target angle θ* and the actual angle θ. Since these effects of suppressing the interference are present, versatility of the software architecture can be enhanced.

<Modification 5>

Figure 13:
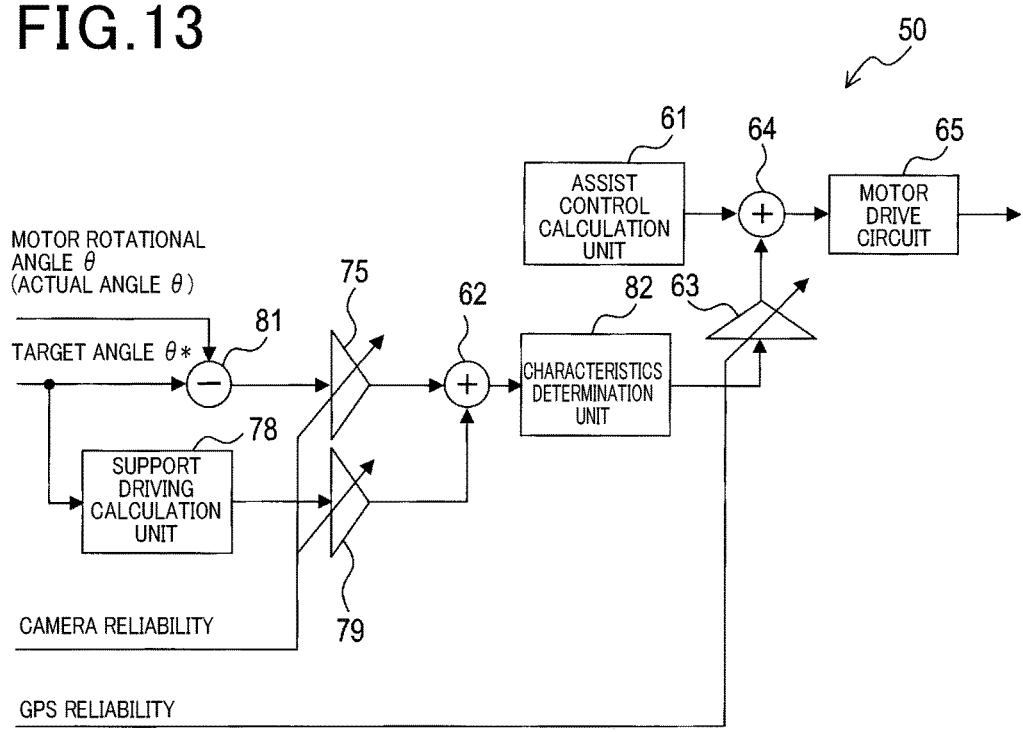
FIG. 13 is a diagram showing a configuration of a steering assist unit according to the fifth embodiment.

According to the modification 5, as shown in FIG. 13, in the steering assist unit 50, the characteristics determination unit 82 may be configured such that the PID gain is added to the new tracking command TC outputted from the adjusting unit 62.

Specifically, the deviation calculation unit 81 may output the deviation between the target angle θ* and the actual angle θ, and the tracking gain control unit 75 may output a value as a new variation where the deviation outputted from the deviation calculation unit 81 is multiplied by the tracking gain α, to the adjusting unit 62. The adjusting unit 62 may output a value as a new tracking command TC to the characteristics determination unit 82, where the value is sum of the deviation outputted from the tracking gain control unit 75 as the tracking command TC, and a new support command SC outputted from the support gain control unit 79. The characteristics determination unit 82 may add the PID gain to the tracking command TC outputted from the adjusting unit 62, and output the tracking command TC to which the PID gain is added, to the GPS reflection unit 63 as the new tracking command TC.

The configuration of the steering assist unit 50 of the modification 5 is equivalent to the configuration of the steering assist unit 50 of the second embodiment, and includes similar effects and advantages to the second embodiment.

<Modification 6>

Figure 14:
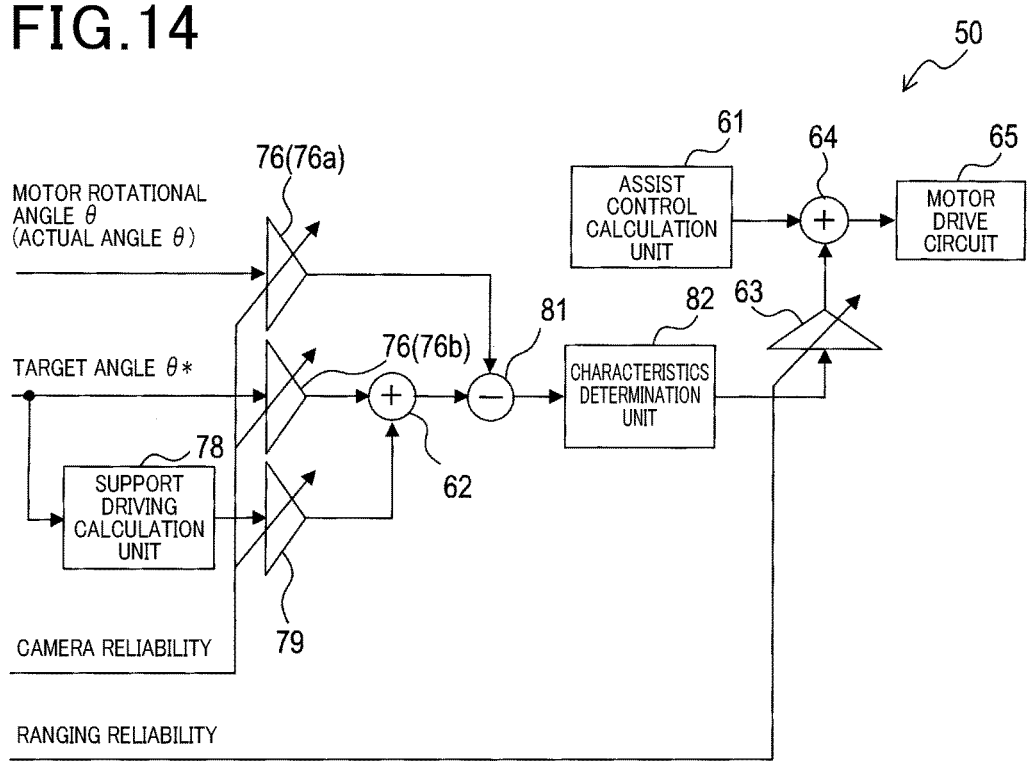
FIG. 14 is a diagram showing a configuration of a steering assist unit according to the sixth embodiment.

In the modification 6, as shown in FIG. 14, in the steering assist unit 50, the tracking gain control unit 76 may be configured such that the target angle θ* is defined as the target value and the actual angle θ is defined as the subject value, and a value where the subject value is multiplied by the tracking gain α is outputted as a new subject value. Specifically, the tracking gain control unit 76a may multiply the actual angle θ and the tracking gain α, and output the multiplied value as the new actual angle θ to the deviation calculation unit 81. The tracking gain control unit 76b may multiply the target angle θ* and the tracking gain α, and output the multiplied value as a new target angle θ*, to the adjusting unit 62.

The adjusting unit 62 adds the new target angle θ* outputted from the tracking gain control unit 76b and the new support command SC outputted from the support gain control unit 79, and outputs the value to the deviation calculation unit 81. The deviation calculation unit 81 outputs the deviation between the actual angle θ outputted from the tracking gain control unit 76a and the new target angle θ* outputted from the adjusting unit 62, to the characteristics determination unit 82. The configuration of this latter part of the characteristics determination unit 82 is the same as that of the modification 5.

The configuration of the steering assist unit 50 of this modification is equivalent to the steering assist unit 50 of the second embodiment, and has similar effects to the second embodiment. Also, the configuration of the steering assist unit 50 has similar effect to the modification 3. Specifically, as disclosed in the modifications 2 to 6, the plurality of detection apparatuses may include at least the camera 11 that detects the location of the vehicle in the left-right direction. The support execution unit 37 may be provided with a steering assist unit 50. The steering assist unit 50 may be configured such that a driving support related to a steering operation is executed in accordance with a command related to the steering operation when received from the support setting unit 36 as the output unit.

The steering assist unit 50 may include the target tracking control calculation unit 71, the motor drive circuit 65 and the tracking gain control unit 72. The target tracking control calculation unit 71 may be configured to output, once a command related to the steering operation is outputted, the tracking command TC as a tracking control value to generate the tracking torque at the motor 6 used for the steering operation. The tracking torque is used such that the detection value of the physical quantity related to the steering operation tracks the target value of the physical quantity thereof. The motor drive circuit 65 may be configured to output the tracking command TC to the motor 6. The tracking gain control units 72 to 76 may be configured to multiply the inputted value by a predetermined gain and output the multiplied value.

The target tracking control calculation unit 71 may be provided with the deviation calculation unit 81, the proportion unit 91, the integral unit 92, the differential unit 94 and the adder unit 96. The deviation calculation unit 81 may be configured to calculate a deviation between the target value and the detection value. The proportion unit 91 may be configured to generate a proportional value which is proportional to the deviation. The integral unit 92 may be configured to generate an integral value in which the deviation is integrated, to be less than an integration upper limit which is set in advance. It should be noted that the integral unit 92 may include the integral gain applying unit 93 and output a value proportional to an integral value to be the integral value.

The differential unit 94 may be configured to generate a differential value where the deviation is differentiated. The differential unit 94 may include a differential gain applying unit 95 and output a value proportional to a differential value to be the differential value. The adder unit 96 may be configured to calculate the tracking command TC using a summed value where the proportional value, either the integral value or the integral proportional value, either the differential value or the differential proportional value are summed.

The tracking gain control unit 73 to 76 may be configured to set the tracking gain α such that the lower the reliability of the camera 11, the smaller the value of the tracking gain α, and output a new subject value based on the tracking gain α, in which a subject value, indicating at least one of the target value, the detection value, the deviation, the proportional value, the integral value, the integral proportional value, the integral upper limit, the differential value, the differential proportional value and the summed value, is multiplied by the tracking gain α.

According to this configuration, when the reliability of the camera 11 is low, the tracking command TC is outputted as a smaller value. Hence, the characteristics of the PID control can be set such that the responsiveness of the PID control becomes low when the reliability of the camera 11 is low.

3. Third Embodiment

Since the third embodiment has a basic configuration which is similar to the second embodiment, only that part of configuration different from the second embodiment will be described. It should be noted that configurations having the same reference numbers as the second embodiment show the same configuration, and preceding explanations should be referred to.

[3-1. Configuration]

According to the third embodiment, configuration differs from the second embodiment in that the target angle calculation unit 51 executes a target calculation process which will be described later, and calculates a target steering angle $\delta_{ref}$ depending on the visibility. Also, the third embodiment differs from the second embodiment in that the target angle calculation unit 51 sets, based on this difference, the target steering angle $\delta_{ref}$ as the target angle $\theta^*$ used for the lane travelling in the target angle process shown in FIG. 7

[3-2. Process]

Figure 7:
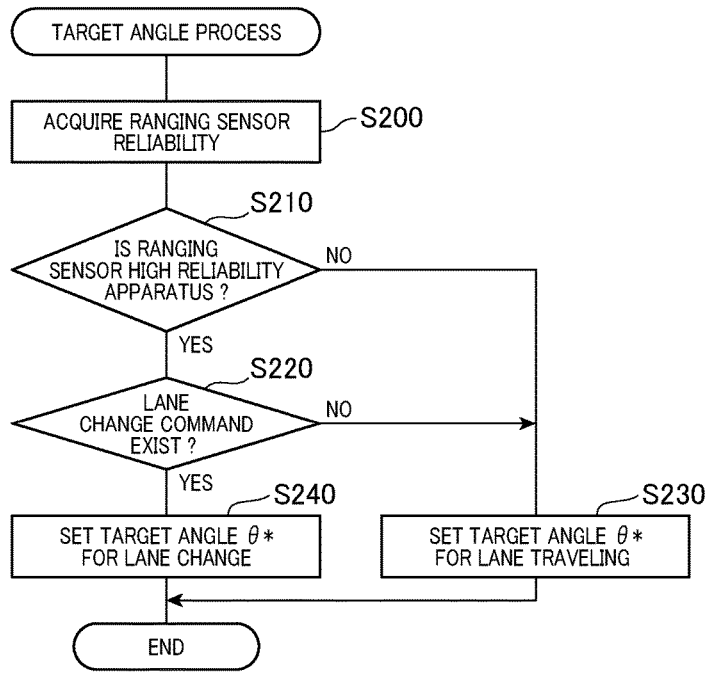
FIG. 7 is a flowchart showing a target angle setting process.
Figure 15:
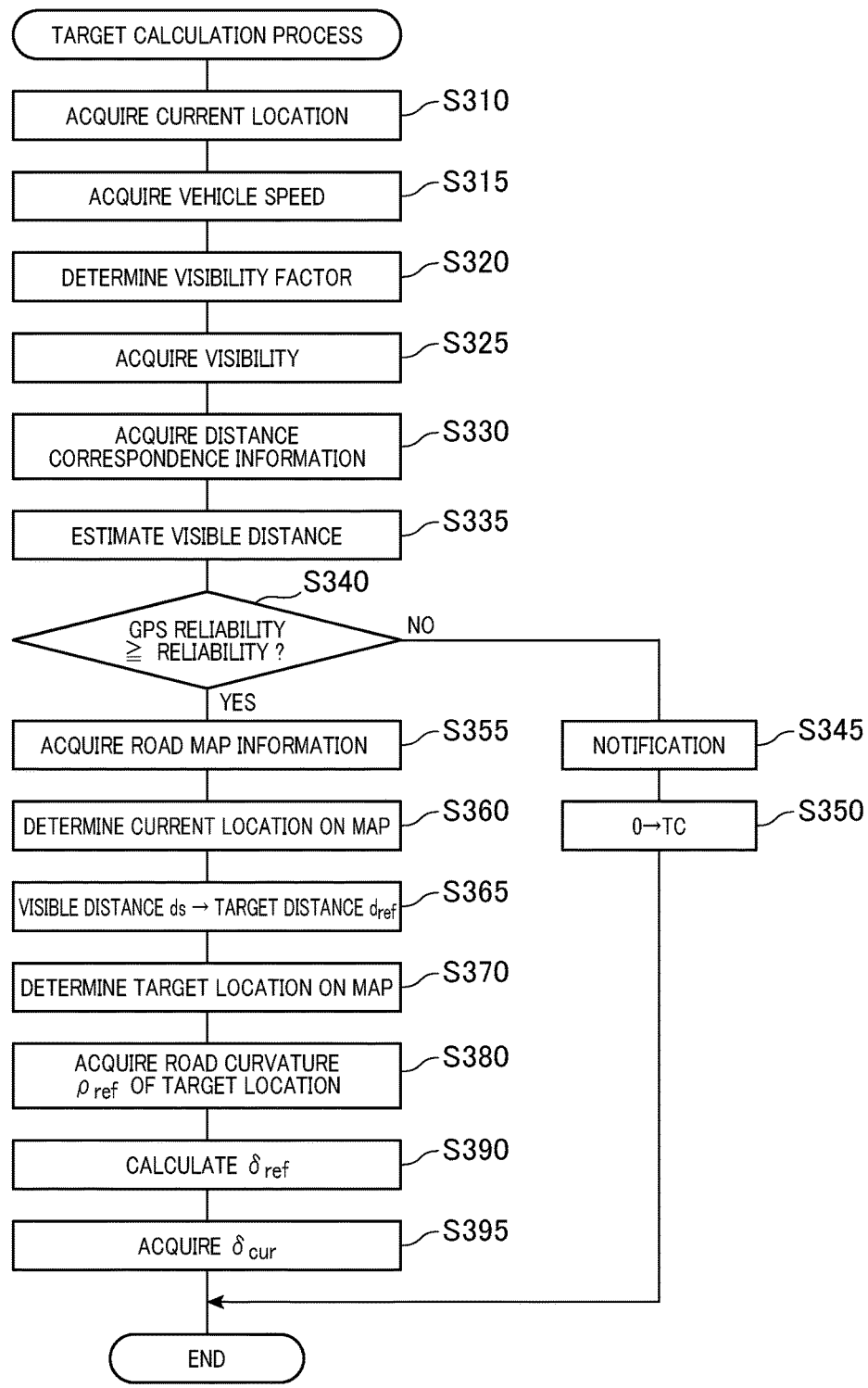
FIG. 15 is a flowchart showing a target calculation process executed by a target angle calculation unit according to the third embodiment.

According to the third embodiment, the target angle calculation unit 51 executes a target calculation process at step S230 in the target angle process shown in FIG. 7, thereby setting the target angle $\theta^*$ for the lane travelling. With reference to FIG. 15, the target calculation process will be described as follows.

At step S310, the target angle calculation unit 51 acquires a current location $P_{CUR}$ of the own vehicle from the GPS 13. At step S315, the target angle calculation unit 51 acquires the vehicle speed V from the vehicle speed sensor 15.

At step S320, a visibility factor is determined based on the detection result (hereinafter referred to environmental value) acquired by the environmental sensor and environmental information. The environmental sensor refers to one or more sensors that detect environment which influence degree of visibility of the driver when viewing ahead of the own vehicle.

Here, the running environment may include an environment due to weather condition (hereinafter referred to as weather environment) such as rain, snow, fog, fine weather, cloudy or the like. Also, the running environment addressed here may include, for example, an environment depending on period of time when the own vehicle is running (hereinafter referred to as time period environment), such as a daytime in which the surroundings is bright or a night time in which the surroundings is dark. The running environment may include an environment due to a traffic condition (hereinafter referred to as traffic environment), for example, heavy traffic in the road where the own vehicle is running.

The visibility factor is a degree of visibility by the driver when viewing ahead of the vehicle, which is expressed by numeric numbers. The term 'ahead' refers to the advanced direction of the own vehicle. The degree of visibility ahead of the vehicle by the driver may include the above-mentioned degree of visibility based on the weather environment, such as the above-mentioned rain, snow, fog, fine weather, cloudy, backlight or the like, a degree of visibility based on the traffic environment such as heavy traffic, a degree of visibility based on the time period environment, etc.

The visibility factor may be expressed by a numerical number having any range. According to the third embodiment, the visibility factor is expressed by a value within a range of 0 to 1 inclusive. The environmental information shows a correspondence between the environmental value and the visibility factor. The environmental correspondence information is stored in the memory 32 in advance.

According to the third embodiment, an example using the ranging sensor 12 as the environmental sensor will be described. When the target angle calculation unit 51 is provided with the ranging sensor 12 as the environmental sensor, the visibility factor may be set as follows. Specifically, the target angle calculation unit 51 may acquire the density of the observation point group (hereinafter referred to as observation point density) detected by the ranging sensor 12, which continuously exists, as the environmental value, and may identify the visibility factor based on the environmental value. Any known methods can be employed for the method of calculating the observation point density from the observation point information acquired by the ranging sensor 12.

Figure 16:
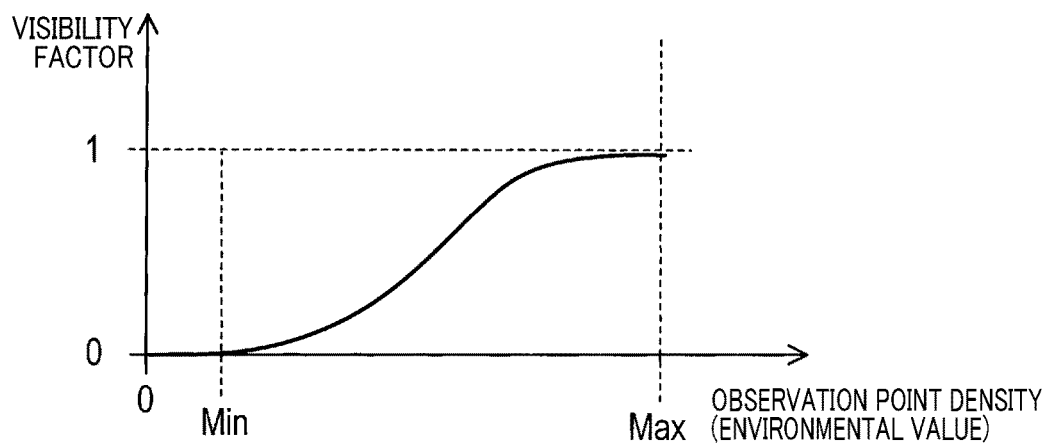
FIG. 16 is a diagram explaining environment correspondence information.

The target angle calculation unit 51 acquires the environmental correspondence information shown in FIG. 16 from the memory 32, and identifies the visibility factor corresponding to the calculated observation density based on the environmental correspondence information. The target angle calculation unit 51 stores the identified visibility factor in the memory 32. In the environmental correspondence information, the minimum value of calculatable observation density is correlated to 0 of the visibility factor, and the maximum value is correlated to 1 of the visibility factor.

High observation point density refers to a state where objects continuously exist ahead of the vehicle, such as lane marking or a guardrail are detected by the ranging sensor 12. The lane marking may include lines which divide the road, such as a white line or yellow line.

In other words, the environment in which such as when lane markings and a guardrail are continuously detected by the ranging sensor 12 refers to an environment in which other vehicles are not present ahead of the own vehicle, that is, no traffic jam has occurred. The ranging sensor 12 is used as an environmental sensor that detects traffic environment.

The target angle calculation unit 51 determines the visibility factor of the ranging sensor 12 based on the environmental correspondence information such that the higher the observation point density, the higher the visibility factor. In other words, the visibility factor may change such that the better the visibility ahead of the vehicle, the larger the visibility factor.

The target angle calculation unit 51 acquires the visibility factor from the memory 32 at step S325. According to the third embodiment, the target angle calculation unit 51 determines the visibility factor 51. However, it is not limited thereto. The target angle calculation unit 51 may not be provided with a specific configuration for determining the visibility factor. In this case, the target angle calculation unit 51 may acquire a visibility factor determined by other unit included in the driving support system 1, similar to the above-described configuration.

Figure 17:
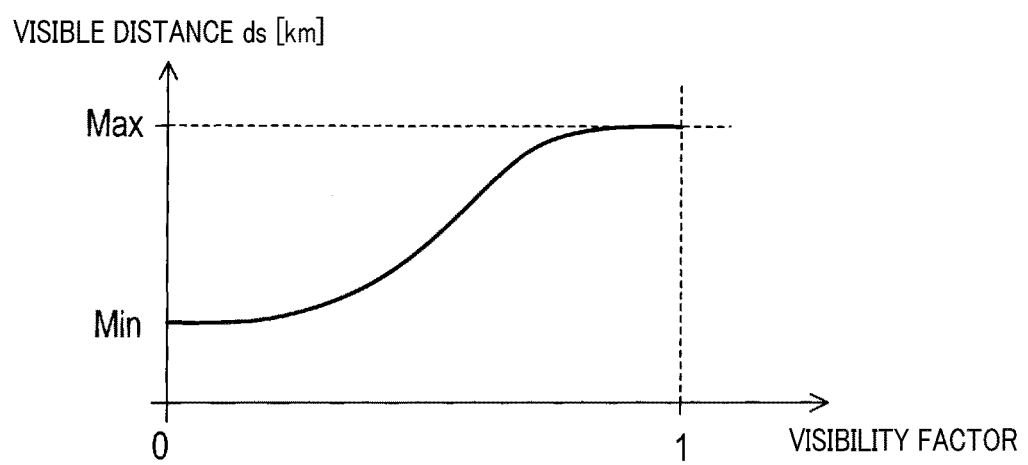
FIG. 17 is a diagram explaining distance correspondence information.

The target angle calculation unit 51 may acquire a distance correspondence information at step S330. As shown in FIG. 17, the distance correspondence information is set such that as the visibility factor increases, the visibility distance ds simply increases. The distance correspondence information is stored in the memory 32 in advance. As the visibility factor increases, the value of the visibility distance ds may increase monotonically, continuously or stepwise, when the visibility factor reaches one or more thresholds.

The target angle calculation unit 51 estimates, at step S335, the visibility distance corresponding to the acquired visibility factor to be the visibility distance ds, based on the acquired visibility factor and the distance correspondence information. The target angle calculation unit 51 calculates, at step S340, the reliability of the GPS unit 13 and determines whether or not the reliability is higher than or equal to a predetermined reliability threshold.

As described above, the reliability of the GPS unit 13 represents a likelihood of the detection result of the GPS unit 13. The reliability of the GPS unit 13 is calculated based on the receiving strength of the GPS signal. The reliability may be calculated to be within a range from 0 to 1 inclusive. The reliability threshold may be set to be 0.5, for example, which may be stored in the memory 32 in advance.

The target angle calculation unit 51 proceeds to step S345 when the reliability of the GPS unit 13 is less than the reliability threshold, and proceeds to step S355 when the reliability of the GPS unit 13 is higher than or equal to the reliability threshold. The target angle calculation unit 51 notifies, at step S345, the driver that the driving support based on the visibility factor is stopped. Specifically, the target angle calculation unit 51 may output sound information indicating that the driving support based on the visibility factor is stopped, to a speaker which is not shown, so as to execute the notification.

The target angle calculation unit 51 executes processes after step S355, whereby the driving support based on the visibility factor is executed. In other words, the target angle calculation unit 51 acquires, at step S355, map information 141 from the recording apparatus 14. Here, the map information 141 may include curvature of the road at any location.

The target angle calculation unit 51 determines, at step S360, the current location $P_{CUR}$ on the road expressed by the map information 141. That is, target angle calculation unit 51 determines the coordinate of the current location $P_{CUR}$ on the map indicated by the map information 141. For the method of determining the current location $P_{CUR}$ on the map, any known methods such as so-called map matching can be used.

Figure 18:
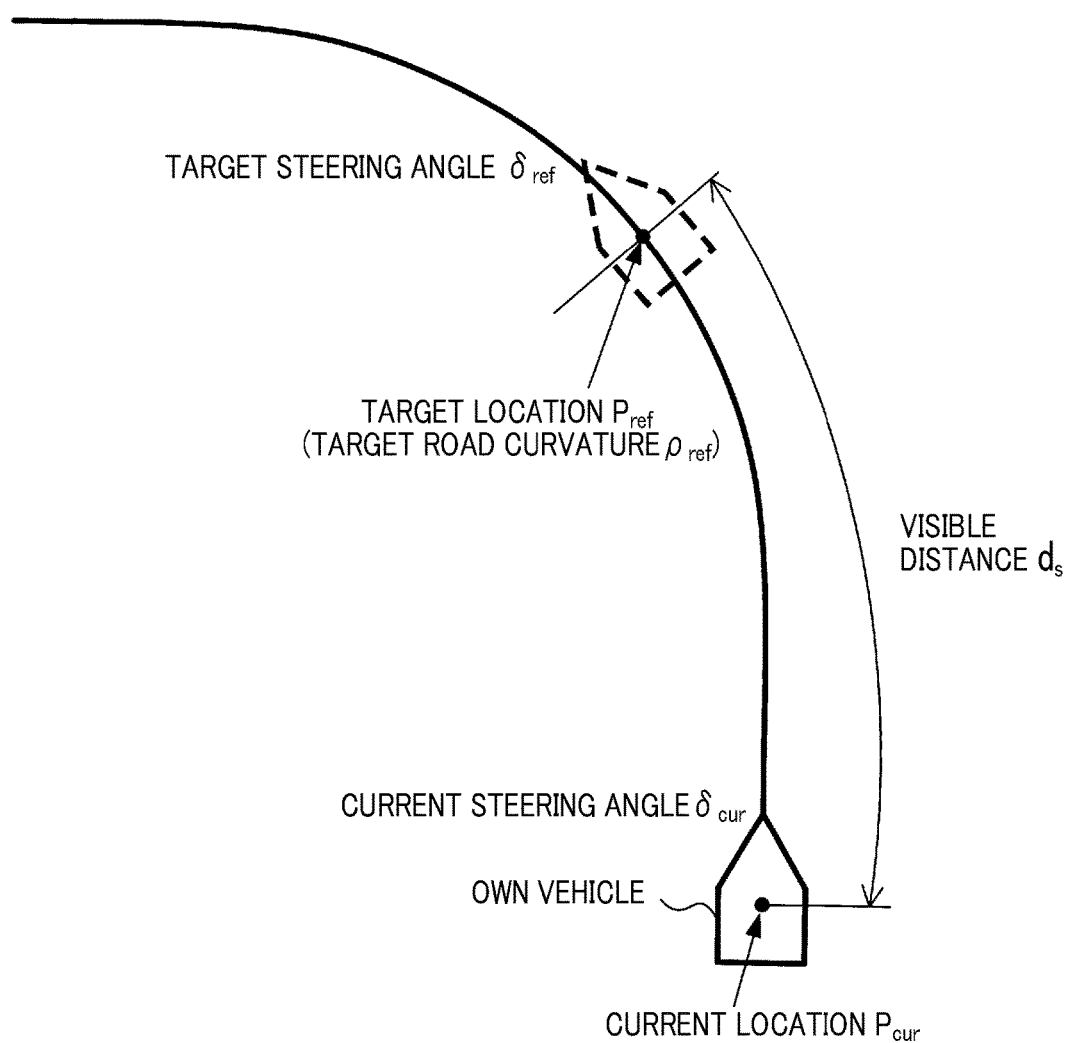
FIG. 18 is a diagram showing a current location, a target location, and a visible distance.

The target angle calculation unit 51 determines, at step S370, the target location $P_{ref}$ on the road indicated by the map information 141. As shown FIG. 18, the target location $P_{ref}$ shows a location which is the visible distance ds away from the current location $P_{CUR}$ in a direction along the road. The target angle calculation unit 51 determines the coordinate of the coordinate of the target location $P_{REF}$ on the map indicated by the map information 141.

At step S380, the target angle calculation unit 51 acquires, from the map information 141, the curvature of the road at the target location $P_{REF}$ to be the target road curvature $\rho_{ref}$. At step S390, the target angle calculation unit 51 calculates, based on the equation (3), the target steering angle $\delta_{ref}$ from the target road curvature $\rho_{ref}$.

$$\delta_{ref} = \rho_{ref} \times L \times (1 - MV^2(K_f L_f - K_r L_r)/(2LK_f K_r)) \quad (3)$$

Here, M represents vehicle weight, where the unit is kg. V represents vehicle speed, where the unit is m/s. L represents wheel base, where the unit is m. Lf represents front wheel base, where the unit is m. Lr represents rear wheel base, where the unit is m. Kf represents front wheel cornering power, where the unit is kN/deg. Kr represents rear wheel cornering power, where the unit is kN/deg.

The wheel base refers to a distance between the front wheel axel and the rear axle in the vehicle. The front wheel base represents a distance between the center of gravity of the vehicle and the front wheel axel. The rear wheel base represents the distance between the center of gravity of the vehicle and the rear wheel axel.

The method of calculating the target steering angle $\delta_{ref}$ based on the target road curvature $\rho_{ref}$ is not limited to equation (3). For example, the target steering angle $\delta_{ref}$ may be calculated using a function or a map which correlates the target road curvature $\rho_{ref}$ and the target steering angle $\delta_{ref}$.

The target angle calculation unit 51 acquires, at step S395, the current steering angle $\delta_{cur}$ indicating the steering angle of the own vehicle at the current location. According to the third embodiment, the current steering angle $\delta_{cur}$ is A acquired based on the detection value of the rotation sensor 18. Then, the target angle calculation unit 51 terminates the target angle calculation process.

[3-3. Operation]

According to the third embodiment, the driving support apparatus 30 operates in the following manner.

(1) The current steering angle $\delta_{cur}$ is set based on the detection value of the rotation sensor 18 at the current location $P_{CUR}$.

(2) The target steering angle $\delta_{ref}$ at the target location $P_{ref}$ set based on the visible distance ds is calculated by using the target road curvature $\rho_{ref}$ acquired from the map information 141.

(3) The tracking torque is outputted so as to lower the deviation between the target steering angle $\delta_{ref}$ and the current steering angle $\delta_{cur}$.

According to this configuration, since the tracking torque is outputted in a direction which makes the target steering angle $\delta_{ref}$ and the current steering angle $\delta_{cur}$ coincident, thereby capable of leading the driver to operate the vehicle to run along the shape of the road. According to the present specification, the term 'coincident' is not limited to a strict definition of 'coincident', but may not be defined strictly as long as the effect where the vehicle is controlled to run depending on the shape of the road is achieved.

[3-4. Effect and Advantages]

According to the third embodiment described above, the following effects and advantages can be obtained.

(3a) The support execution unit 37 may be provided with a target angle calculation unit 51 that calculate the target value. The target angle calculation unit 51 may be provided with a location acquiring unit, a distance estimating unit, a road information acquiring unit, a target curvature unit, and a target calculation unit, and current steering angle unit.

The location acquiring unit acquires the current location $P_{CUR}$ of the vehicle. The distance estimating unit acquires the visibility factor which is a degree of visibility ahead of the vehicle expressed by numeric numbers, and estimates the visibility distance indicating a distance where the driver can visibly recognize ahead of the vehicle, based on the visibility factor.

The road information acquiring unit acquires information about the road on which the vehicle runs, which is the map information 141 including information showing a shape of the road extending in the running direction of the vehicle. The target angle calculation unit acquires the target road curvature $\rho_{ref}$ indicating the road curvature at the target location $P_{ref}$ showing a location which is a visible distance ds away from the current location $P_{CUR}$ of the vehicle in a direction along the road, where the target road curvature $\rho_{ref}$ is included in the curvature of the road estimated based on the current location $P_{CUR}$ of the vehicle and the map information 141.

The target calculation unit 57 calculates the target steering angle $\delta_{ref}$ indicating the steering angle of the vehicle at the target location $P_{ref}$, by using the target road curvature $\rho_{ref}$. The current steering unit 59 acquires the current steering angle $\delta_{cur}$ expressing the steering angle of the vehicle at the current location $P_{CUR}$.

The target tracking control calculation unit 71 calculates the tracking command TC with a tracking torque that drives the steering 2 such that the current steering angle $\delta_{cur}$ becomes the target steering angle $\delta_{ref}$ when the vehicle reaches to the target location $P_{ref}$ as a result of a tracking that the current steering angle $\delta_{cur}$ tracks the target steering angle $\delta_{ref}$, in which the target steering angle $\delta_{ref}$ is defined as the target angle $\theta^*$ and the current steering angle $\delta_{cur}$ is defined as the actual angle $\theta_{cur}$.

According to this configuration, since the target location $P_{ref}$ is set as a location a visible distance ds away from the vehicle, where the visible distance ds changes depending on the degree of visibility by the driver when viewing ahead of the own vehicle, the steering angle can be controlled based on a far location to which the driver can visually recognizes.

As a result, compared to a case where the visible distance ds is set as a fixed value and the target location is defined, based on the fixed value, as a location close to the own vehicle, a control can be made similar to a case where the driver views ahead of the vehicle. Accordingly, the vehicle can be controlled to run without giving discomfort to the driver.

A driver experienced in driving vehicle tends to operate the steering 2 viewing a more distant location than a driver who is not experienced in driving vehicle. In other words, the experienced driver performs a driving operation (hereinafter referred to as look-ahead driving operation), in which the driver starts to operate the steering 2 depending on the shape of the road seen in a distant area, before the vehicle reaches the distant location. According to the third embodiment, since the location which is the visible distance ds away from the own vehicle is set as the target location $P_{ref}$, even in the case where an inexperienced driver operates the steering 2, a driving operation similar to the look-ahead driving operation can be accomplished.

The target angle calculation unit 51 corresponds to the location acquiring unit, the distance estimating unit, the road information acquiring unit, the target curvature unit, the target calculation unit, and the current steering angle unit. Step S310 corresponds to a process as the location acquiring unit, step S335 corresponds to a process as the distance estimation unit, step S355 corresponds to a process as the road information acquiring unit, step S380 corresponds to a process as the target curvature unit, the step S390 corresponds to a process as the target calculation unit, and step S395 corresponds to a process as the current steering unit.

[3-5. Modifications]

According to the above-described embodiments, an example is disclosed, where the ranging sensor 12 is provided as the environmental sensor. However, it is not limited thereto. For example, the driving support system 1 may be provided with the camera 11 as an environmental sensor that detects a traffic environment. In this case, a white line recognition ratio may be used as an environmental value. Also, the driving support system 1 may be provided with a rain sensor (not shown) mounted on the vehicle, detecting rainfall, as the environmental sensor that detects weather environment. In this case, the rainfall may be used as the environmental value. The driving support system 1 may be provided with an illuminance sensor (not shown) mounted on the vehicle, detecting the illuminance, as an environmental sensor that detects a time period environment. In this case, the illuminance may be used as an environmental value.

4. Other Embodiments

Embodiments of the present disclosure have been described so far. The present disclosure is not limited to the above-described embodiments, but can be modified in various ways.

(4a) According to the above-described embodiments, the driving support system 1 includes all of the location detecting unit, the distance detecting unit, and the left-right detecting unit. However, it is not limited thereto. The driving support system 1 may include at least the location detecting unit and the distance detecting unit. In other words, the driving support system 1 may be provided with the GPS unit 13 and the ranging sensor 12, excluding the camera 11. In this case, the correspondence information may be configured such that combinations having information of whether or not each of the GPS unit 13 and the ranging sensor 12 is high reliability apparatus, and types of driving support related to the vehicle speed are correlated. Accordingly, at least a driving support related to the vehicle speed can be performed.

The driving support system 1 may be provided with at least two apparatuses selected from among the location detecting unit, the distance detecting unit, and the left-right detecting unit. In other words, the driving support system 1 may include none of apparatus of the camera 11, the ranging sensor 12, and the GPS unit 13. In this case, the correspondence information may be configured such that combination having information of whether or not the GPS unit 13 and the ranging sensor 12, or the camera 11 included in the driving support system 1 and types of driving support related to the steering operation in the vehicle are correlated. According to this configuration, at least any driving support related to the steering operation can be performed.

(4b) According to the above-described embodiments, the support setting unit 36 repeatedly executes the setting process at predetermined periods while the vehicle is running. However, it is not limited to this configuration. For example, the support setting unit 36 may execute the setting process every time when the ignition switch of the vehicle is ON (4c) The correspondence relationship expressed by the correspondence information is not limited to the correspondence relationship shown in FIG. 4. The correspondence information may be configured such that the combination of high reliability apparatus and any types of driving support are correlated.

(4d) According to the above-described embodiments, the reliability is set to be within a range from 0 to 1 inclusive. However, it is not limited to this configuration. The reliability may be set to any value.

(4e) A plurality of functions included in a single element of the above-described embodiments may be achieved by a plurality of elements, or one function included in a single element may be achieved by a plurality of elements. A plurality of functions included in a plurality of elements may be achieved by a single element, or a function achieved by a plurality of elements may be achieved by a single element. Also, a part of configurations of the above-described embodiments can be omitted. At least part of the above-described configuration may be added to other configurations of the above-described embodiments, or may replace other configurations of the above-described embodiments. It should be noted that various aspects inherent in the technical ideas identified by the scope of the claims are defined as embodiments of the present disclosure.

(4f) The present disclosure may be accomplished in various ways other than the above-described driving support system 1, the driving support apparatus 30 and the CPU 31. That is, a program executed on the CPU 31 to serve as the above-described driving support unit, a non-transitory tangible recording medium such as a semiconductor memory device in which the program is stored, a driving support method and the like are also applicable.

5. Correspondence Between Embodiments and Claims

In the above-described embodiments, the support setting unit 36 corresponds to reliability acquiring unit, a determination unit, a correspondence acquiring unit, a setting unit, and an output unit. Moreover, the support executing unit 37 corresponds to an executing unit. Step S100 corresponds to a process as reliability acquiring unit, step S105 corresponds to a process as a determination unit, and step S110 corresponds to a process as a correspondence acquiring unit. Step S115 corresponds to a process as the setting unit S115, and step S120 corresponds to a process as an output unit.

The camera 11 corresponds to a left-right detecting unit, the ranging sensor 12 corresponds to a distance detecting unit, and the GPS unit 13 corresponds to a location detecting unit. The camera 11, the ranging sensor 12 and the GPS unit 13 correspond to a plurality of detection apparatus.

The target tracking control calculation unit 71 corresponds to the tracking command unit, the motor drive circuit 65 corresponds to a control value output unit. The tracking command TC corresponds to the tracking control value. Also, the support driving calculation unit 78 corresponds to a support command unit. The target angle $\theta^*$ and the target steering angle $\delta_{ref}$ correspond to target values of the physical quantity related to the steering operation, the steering angle $\theta$ and the current steering angle $\delta_{cur}$ correspond to detection values of the physical quantity, and the support command SC corresponds to a support control value.

What is claimed is:

1. A driving support apparatus mounted on a vehicle, performing a plurality of driving supports, the apparatus comprising:
    a reliability acquiring unit that acquires reliabilities of a plurality of detection apparatuses, each detecting a state of the vehicle or a state of a surrounding of the vehicle, the reliabilities being acquired for each of the plurality of detection apparatuses, each reliability representing a likelihood of a detection result of a respective detection apparatus and each of the reliabilities comprising a quantitative value within a predetermined range;
    a determination unit that determines whether each of the detection apparatuses is a reliability apparatus, the reliability apparatus being determined as a detection apparatus having a reliability that is higher than or equal to a reliability threshold;
    a correspondence acquiring unit that acquires correspondence information representing a correspondence between combinations of the plurality of detection apparatuses including information of whether each apparatus is a reliability apparatus and types of driving support to be performed;
    a setting unit that sets a driving support to be performed, based on a result of determination whether each of the detection apparatuses is a reliability apparatus and the correspondence information;
    an executing unit that executes the driving support to be performed; and
    an output unit that outputs a command to allow the executing unit to execute the driving support, wherein
    the plurality of detection apparatuses include at least a left-right detecting unit that detects position of the vehicle in a left-right direction;
    the execution unit includes a steering assist unit that executes, in response to a command related to a steering operation being outputted from the output unit, a driving support related to a steering operation, in accordance with the command outputted from the output unit, wherein
        the steering assist unit includes a tracking command unit, a control value output unit and a tracking gain control unit, the tracking command unit is configured to calculate a tracking control value representing a control value that allows a motor for steering operation to generate a tracking torque, in response to the command related to the steering operation being outputted, tracking torque being used such that a detection value of a physical quantity related to the steering operation tracks a target value of the physical quantity thereof, the control value output unit is configured to output the tracking control command to the motor, and the tracking gain control unit is configured to output a value in which an input value is multiplied by a predetermined gain, the tracking gain control unit is configured to set a tracking gain such that the lower a reliability of the left-right detecting unit, the smaller the tracking gain, multiply the tracking control value by the tracking gain and output the multiplied value as a new tracking control value, the control value output unit is configured to output the new tracking control value as the tracking control value.

2. The driving support apparatus according to claim 1, wherein
    the correspondence information is configured to include the combinations, a driving support to be performed using a detection result of at least one reliability apparatus is included in the combinations, and the combinations and the driving support to be performed are correlated to each other.

3. The driving support apparatus according to claim 1, wherein
    the plurality of detection apparatuses includes at least
        a location detecting unit that detects a location of the vehicle, and
        a distance detecting unit that detects distance between the vehicle and an object in surrounding of the vehicle,
    the correspondence information is configured to include combinations of the location detecting unit and the distance detecting unit in the plurality of detection apparatuses, including information of whether each apparatus is a reliability apparatus and types of driving support related to a vehicle speed, and
    the combinations of the location detecting unit and the distance detecting unit and the types of driving support related to a vehicle speed being correlated to each other.

4. The driving support apparatus according to claim 1, wherein
    the plurality of detection apparatuses is comprised of at least two apparatuses including:
        the location detecting unit which detects location of the vehicle,
        the distance detecting unit which detects distance between the vehicle and an object in surrounding of the vehicle, and
        a left-right detecting unit that detects position of the vehicle in a left-right direction,
    the correspondence information is configured to include combinations of the location detecting unit, the distance detecting unit and the left-right detecting unit in the plurality of detection apparatuses, including information of whether each apparatus is a reliability apparatus and types of driving support related to a steering operation of the vehicle, and
    the combinations of the location detecting unit, the distance detecting unit, the left-right detecting unit and the types of driving support related to a steering operation being correlated to each other.

5. A driving support apparatus mounted on a vehicle, performing a plurality of driving supports, the apparatus comprising:
a reliability acquiring unit that acquires reliabilities of a plurality of detection apparatuses, each detecting a state of the vehicle or a state of a surrounding of the vehicle, the reliabilities being acquired for each of the plurality of detection apparatuses, each reliability representing a likelihood of a detection result of a respective detection apparatus and each of the reliabilities comprising a quantitative value within a predetermined range;
a determination unit that determines whether each of the detection apparatuses is a reliability apparatus, the reliability apparatus being determined as a detection apparatus having a reliability that is higher than or equal to a reliability threshold;
a correspondence acquiring unit that acquires correspondence information representing a correspondence between combinations of the plurality of detection apparatuses including information of whether each apparatus is a reliability apparatus and types of driving support to be performed;
a setting unit that sets a driving support to be performed, based on a result of determination whether each of the detection apparatuses is a reliability apparatus and the correspondence information;
an executing unit that executes the driving support to be performed; and
an output unit that outputs a command to allow the executing unit to execute the driving support, wherein
the plurality of detection apparatuses include at least a left-right detecting unit that detects position of the vehicle in a left-right direction, and
the execution unit includes a steering assist unit that executes, in response to a command related to a steering operation being outputted from the output unit, a driving support related to a steering operation, in accordance with the command outputted from the output unit, wherein
the steering assist unit includes a tracking command unit, a control value output unit and a tracking gain control unit,
the tracking command unit being configured to calculate a tracking control value representing a control value that allows a motor for steering operation to generate a tracking torque, in response to the command related to the steering operation being outputted, the tracking torque being used such that a detection value of a physical quantity related to the steering operation tracks a target value of the physical quantity thereof,
the control value output unit being configured to output the tracking control command to the motor,
the tracking gain control unit being configured to output a value in which an input value is multiplied by a predetermined gain,
the tracking command unit includes: a deviation calculation unit configured to calculate a deviation between the target value and the detection value; a proportion unit configured to generate a proportional value which is proportional to the deviation; an integral unit configured to generate an integral value where the deviation is integrated to be less than an integration upper limit which is a predetermined upper limit; a differential unit configured to generate a differential value where the deviation is differentiated; and an adder unit that sums up the proportional value, the integral value and the differential value and calculates the tracking control value by using the summed value, and
the tracking gain control unit is configured to
set the tracking gain such that the lower a reliability of the left-right detection unit, the smaller the tracking gain,
multiply a subject value by the tracking gain, and
output the multiplied value as a new subject value, the subject value to be multiplied by the tracking gain representing at least one of the target value, the detection value, the deviation, the proportion value, the integral value, the integration upper limit, the differential value and the summed value.

6. The driving support apparatus according to claim 1, wherein
the steering assist unit further includes:
a support command unit configured to calculate a support control value representing a control value that allows the motor to generate a support torque indicating a torque depending on a target value of a physical quantity related to the steering operation;
a support gain control unit configured to
set a support gain such that the higher a reliability of the left-right detection unit, the smaller the support gain,
multiply the support control value by the support gain, and
output the multiplied value as a new support control value;
an adjusting unit configured to add the support control value to the tracking control value and output the added value; and
a motor drive circuit configured to output the new tracking control value.

7. The driving support apparatus according to claim 1, wherein
the execution unit further includes a target angle calculation unit;
the target angle calculation unit includes:
a location acquiring unit configured to acquire a current location of the vehicle;
a distance estimating unit configured to acquire a visibility factor which is a degree of visibility ahead of the vehicle expressed by numeric numbers, and estimate a visibility distance indicating a distance where the driver can visibly recognize ahead of the vehicle, based on the visibility factor;
a road information acquiring unit configured to acquire information about a road on which the vehicle runs, which is map information including information showing a shape of the road extending in a running direction of the vehicle;
a target curvature unit configured to acquire a target road curvature indicating a road curvature at a target location showing a location which is a visible distance away from a current location of the vehicle in a direction along the road, where the target road curvature is included in curvature of the road estimated based on the current location of the vehicle and the map information;
a target calculation unit configured to calculate a target steering angle indicating a steering angle of the vehicle at the target location, by using the target road curvature; and a current steering unit configure to acquire a current steering angle expressing the steering angle of the vehicle at the current location, and the tracking command unit is configured to calculate the tracking control value using the tracking torque, the tracking torque being a torque required to drive the steering such that the current steering angle becomes the target steering angle in response to the vehicle reaching the target location as a result of a tracking that the current steering angle tracks the target steering angle, where the target steering angle is defined as a target value of a physical quantity related to the steering operation, and the current steering angle is defined as the tracking control value.

* * * * *